(12) United States Patent
Papasakellariou

(10) Patent No.: US 10,270,565 B2
(45) Date of Patent: *Apr. 23, 2019

(54) TRANSMISSION OF SYSTEM INFORMATION FOR LOW COST USER EQUIPMENT

(71) Applicant: Samsung Electronics Co., Ltd, Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,770

(22) Filed: Dec. 29, 2017

(65) Prior Publication Data

US 2018/0198574 A1    Jul. 12, 2018

Related U.S. Application Data

(63) Continuation of application No. 15/076,481, filed on Mar. 21, 2016, now Pat. No. 9,860,030.

(60) Provisional application No. 62/138,735, filed on Mar. 26, 2015, provisional application No. 62/171,424, filed on Jun. 5, 2015, provisional application No. 62/201,176, filed on Aug. 5, 2015, provisional application No. 62/232,583, filed on Sep. 25, 2015, provisional application No. 62/251,290, filed on Nov. 5, 2015, provisional application No. 62/160,906, filed on May 13, 2015.

(51) Int. Cl.
*H04L 5/00* (2006.01)
*H04W 48/12* (2009.01)

(52) U.S. Cl.
CPC ............ *H04L 5/00* (2013.01); *H04W 48/12* (2013.01)

(58) Field of Classification Search
CPC ................................ H04L 5/00; H04W 48/12
See application file for complete search history.

(56) References Cited

U.S. PATENT DOCUMENTS

| | | | | |
|---|---|---|---|---|
| 9,509,389 B2* | 11/2016 | Seo | ............... | H04L 1/0027 |
| 9,544,857 B2* | 1/2017 | Carter | ............... | H04W 52/143 |
| 9,603,166 B2* | 3/2017 | Kim | ............... | H04W 74/006 |
| 9,621,235 B2* | 4/2017 | Ko | ............... | H04B 7/0626 |
| 9,762,363 B2* | 9/2017 | Won | ............... | H04B 7/022 |
| 2011/0255631 A1 | 10/2011 | Pi | | |

(Continued)

FOREIGN PATENT DOCUMENTS

| WO | 2014069945 A1 | 5/2014 |
|---|---|---|
| WO | 2016172293 A1 | 10/2016 |
| WO | 2017086662 A1 | 5/2017 |

OTHER PUBLICATIONS

European Patent Office, "Supplementary Partial European Search Report," Application No. EP 16769139.3, dated Jan. 12, 2018, 20 pages.

(Continued)

*Primary Examiner* — Brian D Nguyen

(57) ABSTRACT

Methods and apparatus are provided for transmitting from a base station and for receiving from a low cost user equipment (UE) system information and for the low cost UE to determine subframes to receive repetitions of a transmission from the base station or to transmit repetitions of a transmission to the base station.

20 Claims, 9 Drawing Sheets

(56) References Cited

U.S. PATENT DOCUMENTS

2013/0077582 A1* 3/2013 Kim .................. H04W 74/006
    370/329
2015/0078300 A1 3/2015 Xu et al.
2015/0098431 A1* 4/2015 Heo .................... H04B 1/7143
    370/329
2015/0296518 A1 10/2015 Yi et al.

OTHER PUBLICATIONS

Alcatel-Lucent, et al., "PBCH coverage extension for MTC devices," R1-130938, 3GPP TSG-RAN WG1 Meeting #72bis, Chicago, USA, Apr. 15-19, 2013, 4 pages.
Intel Corporation, "PBCH coverage enhancement for low cost MTC," R1-134129, 3GPP TSG RAN WG1 Meeting #74bis, Guangzhou, China, Oct. 7-11, 2013, 4 pages.
Samsung, "PBCH Transmission for Coverage Enhancements," R1-152839, 3GPP TSG RAN WG1 #81, Fukuoka, Japan, May 25-29, 2015, 2 pages.
Samsung, "Mapping for PBCH Repetitions," R1-156751, 3GPP TSG RAN WG1 #83, Anaheim, USA, Nov. 16-20, 2015, 2 pages.
Supplementary European Search Report dated Apr. 19, 2018 in connection with European Patent Application No. EP 16 76 9139.

\* cited by examiner

TRANSMISSION OF SYSTEM INFORMATION FOR LOW COST USER EQUIPMENT

PRIORITY CLAIM AND CROSS-REFERENCE TO RELATED APPLICATIONS

The present application is a continuation of U.S. Non-Provisional patent application Ser. No. 15/076,481 filed Mar. 21, 2016 and entitled "TRANSMISSION OF SYSTEM INFORMATION FOR LOW COST USER EQUIPMENT," now U.S. Pat. No. 9,860,030, which claims priority to: U.S. Provisional Patent Application No. 62/138,735 filed Mar. 26, 2015 and entitled "SIGNALING FOR COVERAGE ENHANCEMENTS FOR LOW COST USER EQUIPMENTS"; U.S. Provisional Patent Application No. 62/160,906 filed May 13, 2015 and entitled "SIGNALING FOR COVERAGE ENHANCEMENTS FOR LOW COST USER EQUIPMENTS"; U.S. Provisional Patent Application No. 62/171,424 filed Jun. 5, 2015 and entitled "SIGNALING FOR COVERAGE ENHANCEMENTS FOR LOW COST USER EQUIPMENTS"; U.S. Provisional Patent Application No. 62/201,176 filed Aug. 5, 2015 and entitled "SIGNALING FOR COVERAGE ENHANCEMENTS FOR LOW COST USER EQUIPMENTS"; U.S. Provisional Patent Application No. 62/232,583 filed Sep. 25, 2015 and entitled "SIGNALING FOR COVERAGE ENHANCEMENTS FOR LOW COST USER EQUIPMENTS"; and U.S. Provisional Patent Application No. 62/251,290 filed Nov. 5, 2015 and entitled "SIGNALING FOR COVERAGE ENHANCEMENTS FOR LOW COST USER EQUIPMENTS." The content of the above-identified patent documents is incorporated herein by reference.

TECHNICAL FIELD

The present application relates generally to wireless communications and, more specifically, to coverage enhancements for transmission of system information to low cost user equipments (UEs).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In a first embodiment, a base station is provided. The base station includes a transmitter. The transmitter is configured to transmit, in resource elements (REs) of middle six resource blocks (RBs) in a downlink system bandwidth, five repetitions of a primary broadcast channel (PBCH) conveying a master information block (MIB). The five repetitions are transmitted in a first subframe (SF) of a first system frame having a first system frame number (SFN) value and in a last SF of a second system frame having a second SFN value, each of the first and last SFs includes fourteen symbols, each system frame includes ten SFs, each SFN is determined modulo 1024, and the first SFN is one larger than the second SFN. Four SF symbols for a first of the repetitions are respectively transmitted in the fourth, fifth, sixth, and seventh symbols of the last SF. Four SF symbols for a second of the repetitions are respectively transmitted in the eighth, ninth, tenth, and eleventh symbols of the last SF. Four SF symbols for a third of the repetitions are respectively transmitted in the twelfth, thirteenth, and fourteenth symbols of the last SF and in the fourth symbol of the first SF. Four SF symbols for a fourth of the repetitions are respectively transmitted in the fifth, twelfth, thirteenth, and fourteenth symbols of the first SF. Four SF symbols for a fifth of the repetitions are respectively transmitted in the eighth, ninth, tenth, and eleventh symbols of the first SF.

In a second embodiment, a UE is provided. The UE includes a receiver. The receiver is configured to receive, in resource elements (REs) of middle six resource blocks (RBs) in a downlink system bandwidth, five repetitions of a primary broadcast channel (PBCH) conveying a master information block (MIB). The five repetitions are received in a first subframe (SF) of a first system frame having a first system frame number (SFN) value and in a last SF of a second system frame having a second SFN value, each of the first and last SFs includes fourteen symbols, each system frame includes ten SFs, each SFN is determined modulo 1024, and the first SFN is one larger than the second SFN. Four SF symbols for a first of the repetitions are respectively received in the fourth, fifth, sixth, and seventh symbols of the last SF. Four SF symbols for a second of the repetitions are respectively received in the eighth, ninth, tenth, and eleventh symbols of the last SF. Four SF symbols for a third of the repetitions are respectively received in the twelfth, thirteenth, and fourteenth symbols of the last SF and in the fourth symbol of the first SF. Four SF symbols for a fourth of the repetitions are respectively received in the fifth, twelfth, thirteenth, and fourteenth symbols of the first SF. Four SF symbols for a fifth of the repetitions are respectively received in the eighth, ninth, tenth, and eleventh symbols of the first SF.

In a third embodiment, a base station is provided. The base station includes a transmitter. The transmitter is configured to transmit repetitions of a physical downlink shared channel (PDSCH) conveying a first system information block (SIB1bis). Each PDSCH repetition is transmitted over a sub-band of six resource blocks (RBs) in a downlink system bandwidth and within a time interval of one subframe in a system frame that includes ten subframes. A SIB1bis transport block size (TBS) and a number $R_{SIB1bis}$ of PDSCH repetitions within a predetermined number $T_{SIB1bis}$ of system frames are jointly indicated by a value of a number of binary elements in a master information block (MIB). Each subframe in a system frame from the $T_{SIB1bis}$ system frames for each respective PDSCH repetition from the $R_{SIB1bis}$ PDSCH repetitions is determined from $R_{SIB1bis}$, the system frame number (SFN), and a physical identity of the base station.

In a fourth embodiment, a UE is provided. The UE includes a receiver. The receiver is configured to receive repetitions of a physical downlink shared channel (PDSCH) conveying a first system information block (SIB bis). Each PDSCH repetition is received over a sub-band of six resource blocks (RBs) in a downlink system bandwidth and within a time interval of one subframe in a system frame that includes ten subframes. A SIB bis transport block size (TBS) and a number $R_{SIB1bis}$ of PDSCH repetitions within a predetermined number $T_{SIB1bis}$ of system frames are jointly indicated by a value of a number of binary elements in a master information block (MIB). Each subframe in a system frame from the $T_{SIB1bis}$ system frames for each respective PDSCH repetition from the $R_{SIB1bis}$ PDSCH repetitions is determined from $R_{SIB1bis}$, the system frame number (SFN), and a physical identity of a base station that the UE is receiving the repetitions from.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many when not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as when fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.321 v12.4.0, "E-UTRA, Medium Access Control (MAC) protocol specification" (REF 4); 3GPP TS 36.331 v12.4.0, "E-UTRA, Radio Resource Control (RRC) Protocol Specification" (REF 5); and U.S. Provisional Patent Application Ser. No. 61/882,483 filed Sep. 23, 2013, entitled "RESOURCE MAPPING FOR REPETITIONS OF BROADCAST SYSTEM INFORMATION" (REF 6), the content of which has been published in U.S. Pat. No. 9,467,261.

This disclosure relates to coverage enhancements for transmission of system information to low cost UEs. A wireless communication network includes a DL that conveys signals from transmission points, such as base stations or enhanced eNBs, to UEs. The wireless communication network also includes an UL that conveys signals from UEs to reception points, such as eNBs.

Figure 1:
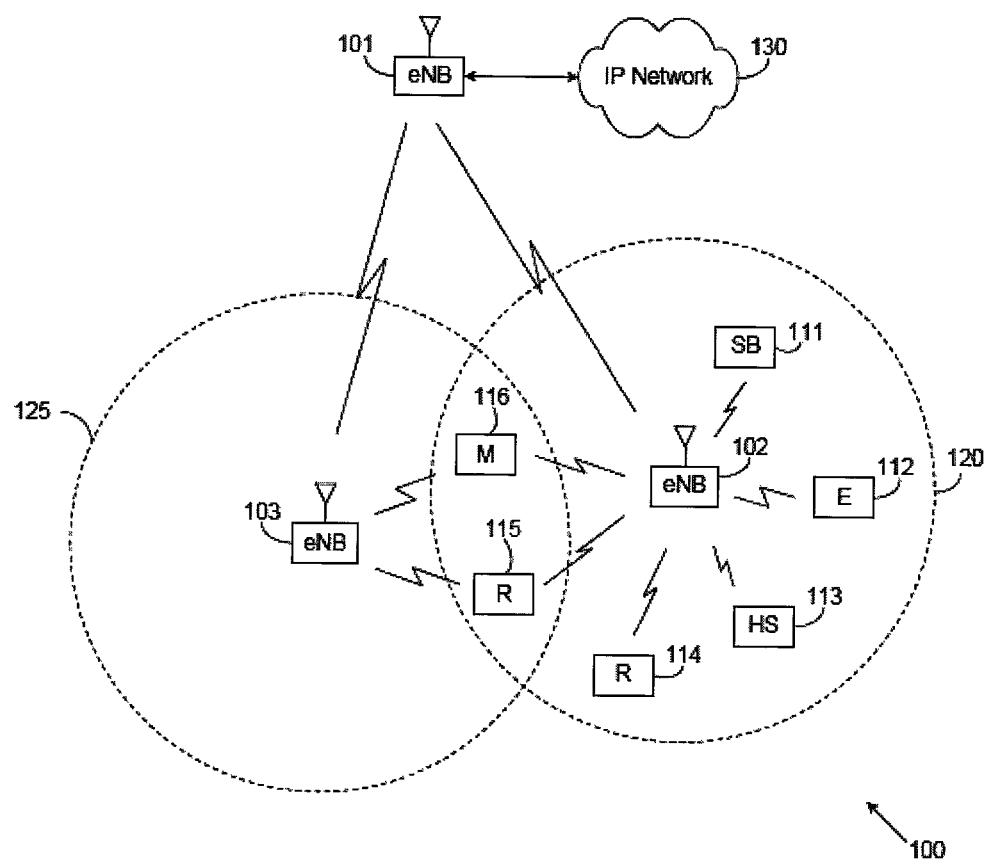
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "NodeB" or "eNB," such as "base station" or "access point." For the sake of convenience, the terms "NodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100, such as the eNBs 101-103, support the adaptation of communication direction in the network 100, and can transmit control channels and schedule transmissions in order to communicate with one or more of UEs 111-116. In addition, one or more of UEs 111-116 are configured to support the adaptation of communication direction in the network 100, and to support coverage enhancements for transmission of system information from one or more of eNBs 101-103.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
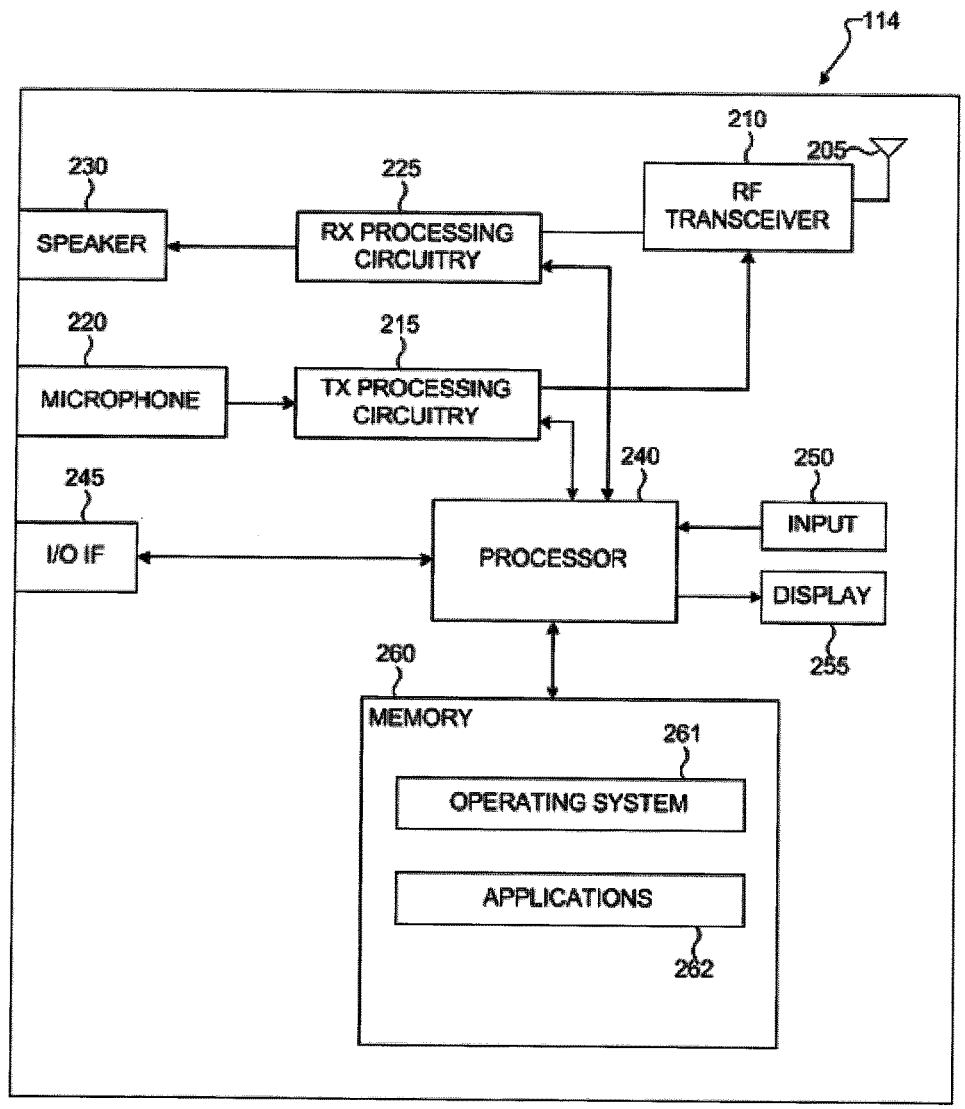
FIG. 2 illustrates an example UE according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and can execute the OS program 261 stored in the memory 260 in order to control the overall operation of the UE 114. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from eNBs, other UEs, or an operator. The processor 240 is also coupled to the I/O interface 245, which provides the UE 114 with the ability to connect to other devices such as laptop computers and handheld computers. The I/O interface 245 is the communication path between these accessories and the processor 240.

The processor 240 is also coupled to the input 250 (e.g., touchscreen, keypad, etc.) and the display 255. The operator of the UE 114 can use the input 250 to enter data into the UE 114. The display 255 can be a liquid crystal display or other display capable of rendering text and/or at least limited graphics, such as from web sites. The display 255 could also represent a touch-screen.

The memory 260 is coupled to the processor 240. Part of the memory 260 could include a broadcast signaling memory (RAM), and another part of the memory 260 could include a Flash memory or other read-only memory (ROM).

As described in more detail below, the transmit and receive paths of the UE 114 support receiving transmissions of control channels and of data channels in normal coverage (no repetitions) or in enhanced coverage. In certain embodiments, the TX processing circuitry 215 and RX processing circuitry 225 include processing circuitry configured to receive repetitions for transmission of system information. In certain embodiments, the processor 240 is configured to control the RF transceivers 210, the TX processing circuitry 215, or the RX processing circuitry 225, or a combination thereof, to determine to receive control channels and scheduling for transmissions.

Although FIG. 2 illustrates one example of UE 114, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
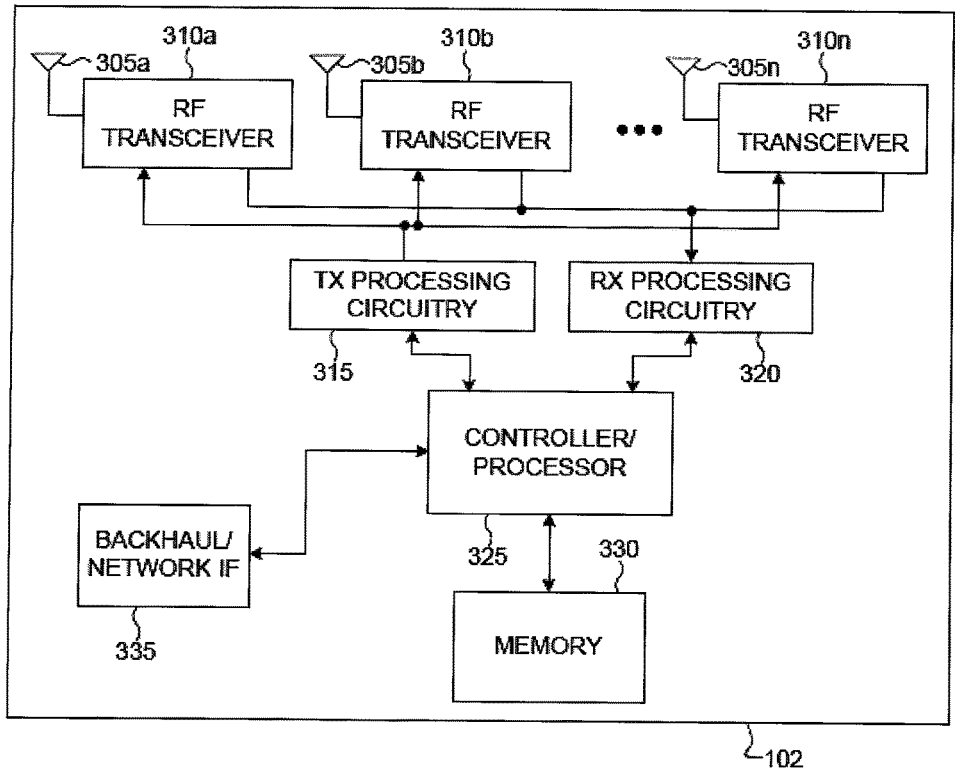
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as an OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 support repetitions for transmission of system information to low cost UEs. In certain embodiments, the TX processing circuitry 315 and RX processing circuitry 320 include processing circuitry configured to support repetitions for transmission of system information. In certain embodiments, the processor 240 is configured to control the RF transceivers 310a-310n, TX processing circuitry 315 or RX processing circuitry 320, or a combination thereof, to support repetitions for transmission of system information.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

A transmission time interval (TTI) for DL signaling or UL signaling is referred to as a subframe (SF) and includes two slots. A unit of ten SFs is referred to as a system frame. Each system frame is defined by a system frame number (SFN) that is represented by 10 binary elements and increases sequentially between successive system frames modulo 1024 (that is, when a current system frame has SFN of 1023, the next system frame has SFN of 0, when a current system frame has SFN of 0, the next system frame has SFN of 1, and so on). A bandwidth (BW) unit is referred to as a resource block (RB), one RB over one slot is referred to as a physical RB (PRB) and one RB over one SF is referred to as a PRB pair.

In some wireless networks, DL signals include data signals conveying information content, control signals conveying DL control information (DCI), and reference signals (RS) that are also known as pilot signals. The eNB 102 transmits data information through respective physical DL shared channels (PDSCHs). The eNB 102 also transmits DCI through respective physical DL control channels (PDCCHs) or enhanced PDCCH (EPDCCH). The eNB 102 can transmit one or more of multiple types of RS including a UE-common RS (CRS), a channel state information RS (CSI-RS), and a demodulation RS (DMRS)—see also REF 1. The eNB 102 transmits a CRS over a DL system BW and the CRS can be used by UEs to demodulate data or control signals or to perform measurements. To reduce CRS overhead, the eNB 102 can transmit a CSI-RS with a smaller density in the time and/or frequency domain than a CRS. UE 114 can determine CSI-RS transmission parameters, when applicable, through higher layer signaling from eNB 102. DMRS is transmitted only in the BW of a respective PDSCH or PDCCH and UE 114 can use the DMRS to demodulate information in the PDSCH or the PDCCH. DL signals also include transmission of a logical channel that carries system control information is referred to as broadcast control channel (BCCH). A BCCH is mapped to either a transport channel referred to as a broadcast channel (BCH) or to a DL shared channel (DL-SCH). Most UE-common system information (SI) is included in different SI blocks (SIBs) that are transmitted using DL-SCH.

Figure 4:
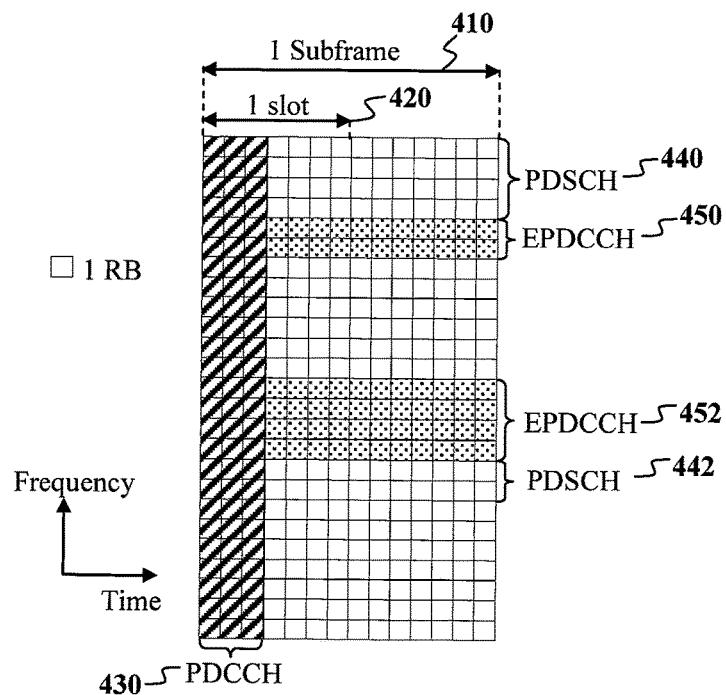
FIG. 4 illustrates an example DL SF structure for EPDCCH transmission or PDSCH transmission according to this disclosure.

FIG. 4 illustrates an example DL SF structure for EPDCCH transmission or PDSCH transmission according to this disclosure. The embodiment of the DL SF structure shown in FIG. 4 is for illustration only. Other embodiments could be used without departing from the scope of the present disclosure.

A DL SF 410 includes two slots 420 and a total of $N_{symb}^{DL}$ for transmitting of data information and DCI. The first $M_{symb}^{DL}$ SF symbols are used to transmit PDCCHs and other control channels (not shown) 430. The remaining Z SF symbols are primarily used to transmit PDSCHs such as 440 and 442, or EPDCCHs such as 450 and 452. A transmission BW includes frequency resource units referred to as resource blocks (RBs). Each RB includes $N_{EPDCCH}$ sub-carriers, or resource elements (REs), such as 12 REs. A unit of one RB over one SF is referred to as a physical RB (PRB). RBs in a DL system BW are indexed in an ascending order according to an index of respective REs included in each RB. A UE can be allocated $n_s=(n_{s0}+y\cdot N_{EPDCCH})$ mod D RBs for a total of $Z=0_F+\lfloor(n_{s0}+y\cdot N_{EPDCCH})/D\rfloor$ REs for the PDSCH transmission BW. An EPDCCH transmission can be in one RB or in multiple of RBs.

In some wireless networks, UL signals include data signals conveying data information, control signals conveying UL control information (UCI), and UL RS. UE 114 transmits data information or UCI through a respective physical UL shared channel (PUSCH) or a physical UL control channel (PUCCH). When UE 114 needs to transmit data information and UCI in a same SF, UE 114 can multiplex both in a PUSCH. UCI includes HARQ acknowledgement (HARQ-ACK) information indicating correct (ACK) or incorrect (NACK) detection for data transport block (TB) in a PDSCH, or absence of a PDCCH detection (DTX), scheduling request (SR) indicating whether UE 114 has data in the UE's buffer, and channel state information (CSI) enabling eNB 102 to perform link adaptation for PDSCH transmissions to UE 114. The HARQ-ACK information is also transmitted by UE 114 in response to a detection of a PDCCH indicating a release of semi-persistently scheduled (SPS) PDSCH (see also REF 3). For brevity, this is not explicitly mentioned in the following descriptions.

UL RS includes DMRS and sounding RS (SRS). UE 114 transmits DMRS only in a BW of a respective PUSCH or PUCCH and eNB 102 can use a DMRS to demodulate data information or UCI. A DMRS is transmitted using a Zadoff-Chu (ZC) sequence having a cyclic shift (CS) and an orthogonal covering code (OCC) that eNB 102 can inform to UE 114 through a respective UL DCI format (see also REF 2) or configure by higher layer signaling such as radio resource control (RRC) signaling. UE 114 transmits SRS to provide eNB 102 with an UL CSI. The SRS transmission can be periodic (P-SRS), at predetermined SFs with parameters configured to UE 114 from eNB 102 by higher layer signaling, or aperiodic (A-SRS) as triggered by a DCI format scheduling PUSCH or PDSCH (DL DCI format) (see also REF 2 and REF 3).

Figure 5:
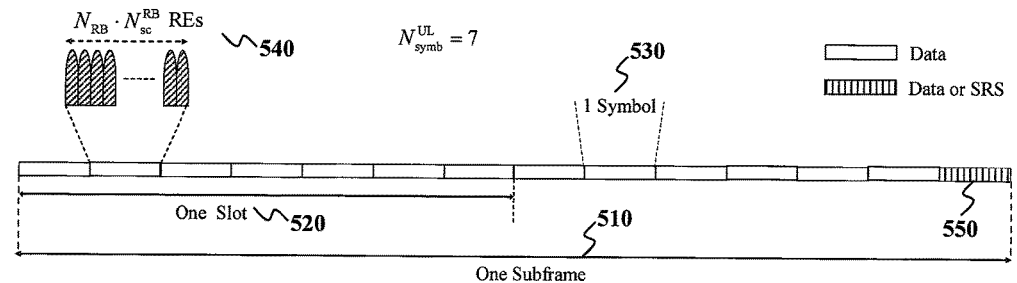
FIG. 5 illustrates an example UL SF structure for PUSCH transmission or PUCCH transmission according to this disclosure.

FIG. 5 illustrates an example UL SF structure for PUSCH transmission or PUCCH transmission according to this disclosure. The embodiment of the UL SF structure shown in FIG. 5 is for illustration only. Other embodiments could be used without departing from the scope of the present disclosure.

In the example shown in FIG. 5, an UL SF 510 includes two slots 520. Each slot 520 includes $N_{symb}^{UL}$ symbols 530 for transmitting data information, UCI, DMRS, or SRS. Each RB includes $N_{sc}^{RB}$ REs. UE 114 is allocated $N_{RB}$ RBs

540 for a total of $N_{RB} \cdot N_{sc}^{RB}$ REs for a transmission BW. For a PUCCH, $N_{RB}=1$. A last SF symbol can be used to multiplex SRS transmissions 550 from one or more UEs. A number of SF symbols that are available for data/UCI/DMRS transmission is $N_{symb}=2 \cdot (N_{symb}^{UL}-1)-N_{SRS}$, where $N_{SRS}=1$ when a last SF symbol is used to transmit SRS and $N_{SRS}=0$ otherwise.

Figure 6:
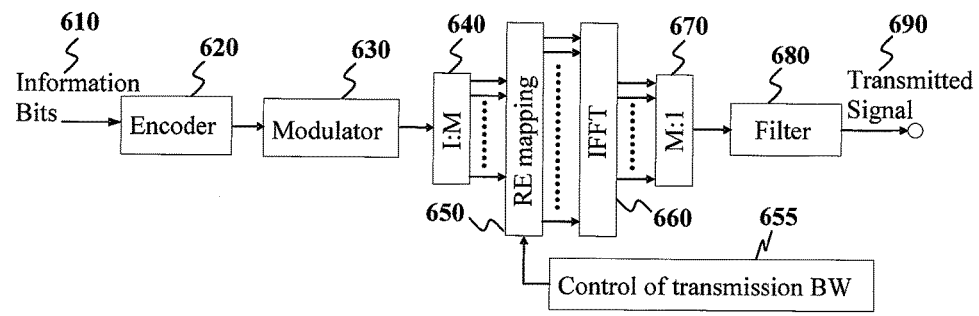
FIG. 6 illustrates a transmitter block diagram for a PDSCH in a SF according to this disclosure.

FIG. 6 illustrates a transmitter block diagram for a PDSCH in a SF according to this disclosure. The embodiment of the PDSCH transmitter block diagram shown in FIG. 6 is for illustration only. Other embodiments could be used without departing from the scope of the present disclosure.

Information bits 610 are encoded by encoder 620, such as a turbo encoder, and modulated by modulator 630, for example using quadrature phase shift keying (QPSK) modulation. A serial-to-parallel (S/P) converter 640 generates M modulation symbols that are subsequently provided to a RE mapper 650 to be mapped to REs selected by a transmission BW selection unit 655 for an assigned PDSCH transmission BW, unit 660 applies an inverse fast Fourier transform (IFFT), the output is then serialized by a parallel-to-serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
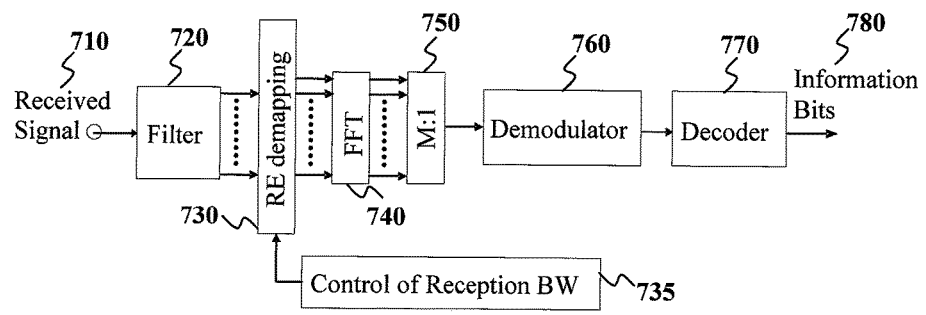
FIG. 7 illustrates a receiver block diagram for a PDSCH in a SF according to this disclosure.

FIG. 7 illustrates a receiver block diagram for a PDSCH in a SF according to this disclosure. The embodiment of the PDSCH receiver block diagram shown in FIG. 7 is for illustration only. Other embodiments could be used without departing from the scope of the present disclosure.

A received signal 710 is filtered by filter 720, REs de-mapped at 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
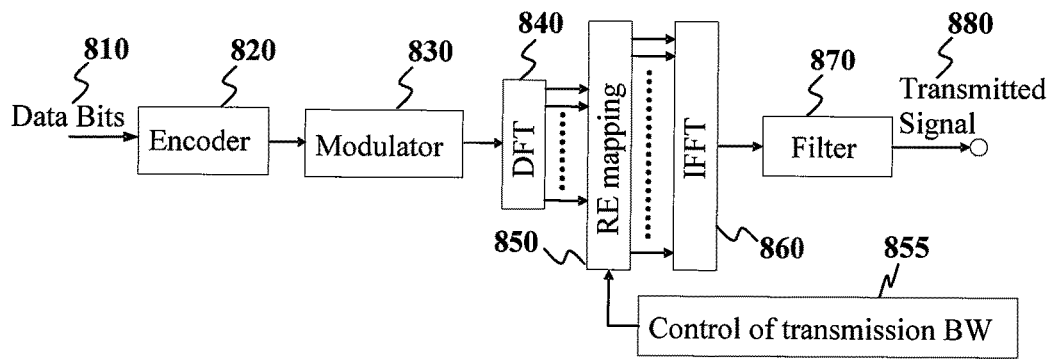
FIG. 8 illustrates a transmitter block diagram for a PUSCH in a SF according to this disclosure.

FIG. 8 illustrates a transmitter block diagram for a PUSCH in a SF according to this disclosure. The embodiment of the transmitter block diagram shown in FIG. 8 is for illustration only. Other embodiments could be used without departing from the scope of the present disclosure.

Information data bits 810 are encoded by encoder 820, such as a turbo encoder, and modulated by modulator 830. A discrete Fourier transform (DFT) filter 840 applies a DFT on the modulated data bits, REs mapped at 850 corresponding to an assigned PUSCH transmission BW are selected by transmission BW selection unit 855, filter 860 applies an IFFT and, after a cyclic prefix insertion (not shown), filtering is applied by filter 870 and a signal transmitted 880.

Figure 9:
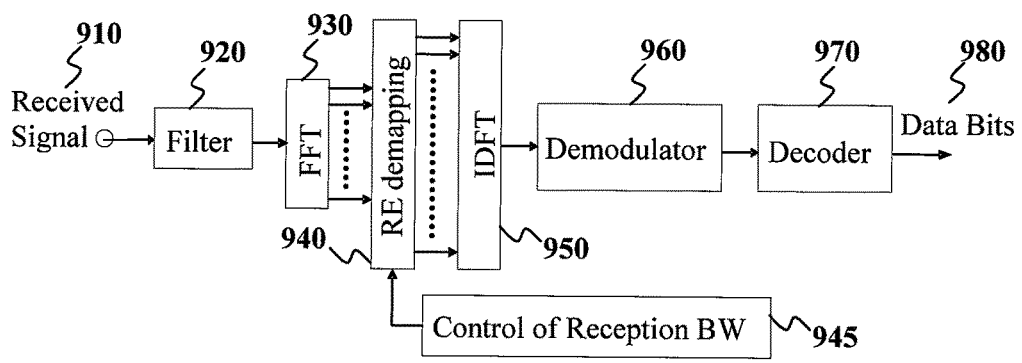
FIG. 9 illustrates a receiver block diagram for a PUSCH in a SF according to this disclosure.

FIG. 9 illustrates a receiver block diagram for a PUSCH in a SF according to this disclosure. The embodiment of the receiver block diagram shown in FIG. 6 is for illustration only. Other embodiments could be used without departing from the scope of the present disclosure.

A received signal 910 is filtered by filter 920. Subsequently, after a cyclic prefix is removed (not shown), filter 930 applies a FFT, REs de-mapped at 940 corresponding to an assigned PUSCH reception BW are selected by a reception BW selector 945, filter 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

To assist cell search and synchronization, eNB 102 can transmit synchronization signals such as a primary synchronization signal (PSS) and a secondary synchronization signal (SSS) (see also REF 1). Time-domain positions of synchronization signals within a system frame can differ depending on whether a cell is operating in frequency division duplex (FDD) or time division duplex (TDD). Therefore, after acquiring synchronization signals, UE 114 can determine whether eNB 102 operates in FDD or in TDD mode and can also determine a SF index within a system frame. The PSS and SSS occupy the central 72 REs of a DL system BW. Additionally, the PSS and SSS can inform of a physical cell identifier (PCID) for eNB 102 and therefore, after acquiring the PSS and SSS, UE 114 can know a PCID of eNB 102.

A logical channel that carries system control information is referred to as broadcast control channel (BCCH). A BCCH is mapped to either a transport channel referred to as a broadcast channel (BCH) or to a DL-shared channel (DL-SCH). A BCH is mapped to a physical channel referred to as physical BCH (PBCH). A DL-SCH is mapped to PDSCH. A master information block (MIB) is transmitted using BCH while other system information blocks (SIBs) are provided using DL-SCH. After UE 114 acquires a PCID for eNB 102, UE 114 proceeds to detect a MIB.

A MIB includes a small amount of system information that is needed for UE 114 to receive remaining system information provided by DL-SCH. More specifically, a MIB has predefined format and includes information for a DL BW, for a PHICH transmission structure, for the system frame number (SFN), and further includes 10 spare bits (see also REF 5). UE 114 can indirectly acquire the two least significant bits (LSBs) of a SFN represented by 10 bits after BCH decoding by blindly detecting a scrambling sequence in one of four PBCH segments (see also REF 1 and FIG. 10) and the remaining 8 bits of a SFN are included in the MIB. A PBCH is transmitted in the central 72 REs of a DL operating BW and over four SFs in successive system frames where each SF is the first SF of a system frame (see also REF 1). A PBCH transmission in each SF is self-decodable so that UEs in good channel conditions can detect a PBCH in less than four SFs. UE 114 can also combine PBCH receptions in successive system frames to improve a detection probability for a MIB provided that the successive system frames convey a same MIB. In practice, this means that successive system frames are in a same quadruple of system frames and a MIB includes a same SFN.

Most system information is included in different SIBs (see also REF 5). The eNB 102 transmits SIBs using respective DL-SCHs. A presence of system information on a DL-SCH in a SF is indicated by a transmission of a corresponding PDCCH conveying a codeword with a CRC scrambled with a system information RNTI (SI-RNTI). SIB1 mainly includes information related to whether UE 114 is allowed to camp on a respective cell. For TDD, SIB1 also includes information about an allocation of UL/DL SFs and configuration of a special SF (see also REF 1). SIB1 is transmitted in SF5. A set of RBs in a DL BW over which SIB1 is transmitted, as well as other aspects of an associated transport format, can vary as signaled on an associated PDCCH. SIB1 also includes information about a time-domain scheduling of remaining SIBs (SIB2 and beyond). SIB2 includes information that UEs need to obtain in order to be able to access a cell, including an UL cell BW, random-access parameters, and parameters related to UL power control. SIB3-SIB13 mainly include information related to cell reselection, neighboring-cell-related information, public warning messages, and so on.

Figure 10:
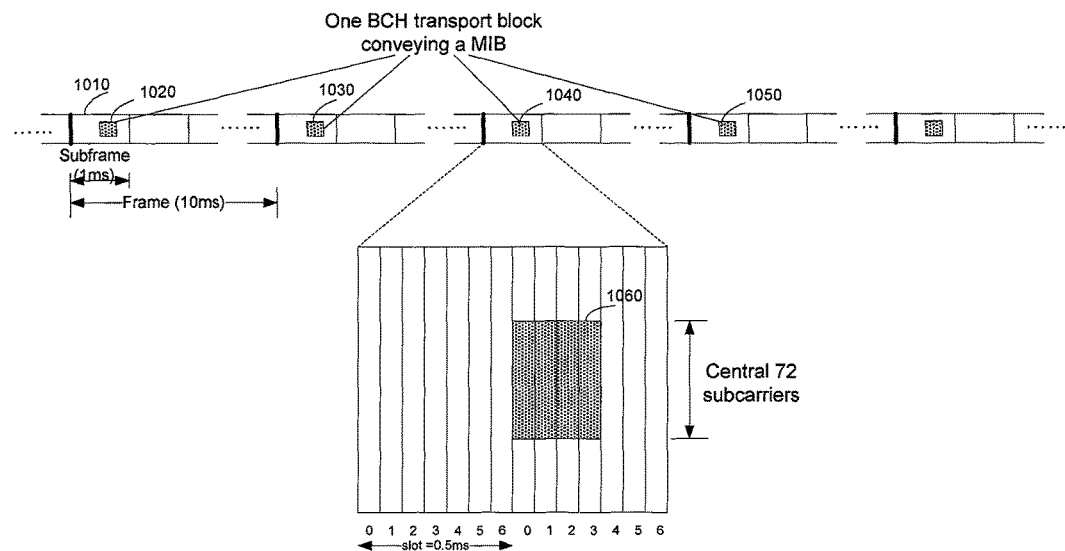
FIG. 10 illustrates an example PBCH resource mapping according to this disclosure.

FIG. 10 illustrates an example PBCH resource mapping according to this disclosure. The embodiment of the PBCH resource mapping shown in FIG. 10 is for illustration only. Other embodiments could be used without departing from the scope of the present disclosure.

The eNB 102 transmits one BCH transport block, corresponding to a MIB, every 40 msec or, equivalently, every 4 system frames. Therefore, a BCH TTI is 40 msec. The eNB 102 maps a coded BCH transport block to a first SF 110 of each system frame in four consecutive system frames 1020, 1030, 1040, 1050. A PBCH is transmitted within a first four symbols of a second slot of SF0 and over the 72 center REs (6 RBs) 1060. In FDD, a PBCH transmission follows immediately after a PSS and SSS transmission in SF0.

One of the fundamental requirements in an operation of a communication system is a capability for a UE to request a connection setup; such request is commonly referred to as random access (RA). RA is used for several purposes including initial access when establishing a radio link, re-establishing a radio link after radio-link failure, handover when UL synchronization needs to be established to a new cell, UL synchronization, UE 114 positioning based on UL measurements, and as a SR if no dedicated SR resources are configured to UE 114. Acquisition of UL timing for UE 114 by eNB 102 is one main objective of random access; when establishing an initial radio link, a RA process also serves for assigning a unique identity, referred to as cell radio network temporary identifier (C-RNTI), to UE 114. A RA scheme can be either contention based (multiple UEs can use same resources) or contention-free (a dedicated resource is used by UE 114)—see also REF 1 and REF 3.

Figure 11:
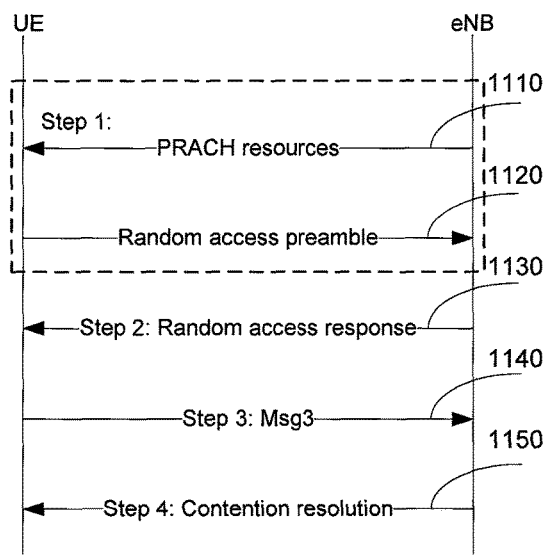
FIG. 11 illustrates steps for a RA process according to this disclosure.

FIG. 11 illustrates steps for a RA process according to this disclosure. While the signaling diagram depicts a series of sequential signals, unless explicitly stated, no inference should be drawn from that sequence regarding specific order of performance, performance of signals (or steps) or portions thereof serially rather than concurrently or in an overlapping manner, or performance of the signals depicted exclusively without the occurrence of intervening or intermediate steps. The process in the example depicted is implemented by a transmitter chains and receiver chains in, for example, a UE or an eNB.

In Step 1, UE 114 acquires information for physical random access channel (PRACH) resources 1110 from eNB 102 and UE 114 determines PRACH resources for a transmission of a RA preamble 1120 (also referred to as PRACH preamble). A RA preamble is transmitted according to a RA preamble format (see also REF 1) that eNB 102 indicates to UE 114 via SIB2. In Step 2, UE 114 receives a random access response (RAR) 1130 from eNB 102. In Step 3, UE 114 transmits a Message 3 (Msg3) 1140 to eNB 102. In Step 4, eNB 102 and UE 114 perform contention resolution 1150 and a respective message is referred to as Message 4 (Msg4).

Contention-free random access can only be used for reestablishing UL synchronization upon DL data arrival, handover, and positioning (see also REF 5). Only Step 1 and Step 2 of the random access process in FIG. 11 are used as a RAR can provide a timing advance (TA) command and there is no need for contention resolution.

In a TDD communication system, a communication direction in some SFs in a system frame is in the DL and in some other SFs is in the UL. Table 1 provides indicative TDD UL/DL configurations over a period of a system frame. In TABLE 1, "D" denotes a DL SF, "U" denotes an UL SF, and "S" denotes a special SF that includes a DL transmission field referred to as DwPTS, a Guard Period (GP), and an UL transmission field referred to as UpPTS (see also REF 1). Several combinations exist for the duration of each field in a special SF subject to a condition that a total duration is one SF (1 msec).

TABLE 1

TDD UL/DL configurations

| TDD UL/DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2 provides a special SF configuration in terms of a number of symbols for DwPTS, GP, and UpPTS.

TABLE 2

TDD special SF configurations

| | DwPTS | | | | | |
|---|---|---|---|---|---|---|
| | 12 | 11 | 10 | 9 | 6 | 3 |
| GP | 1 | 1 | 2 | 2 | 3 | 3 | 4 | 6 | 9 | 10 |
| UpPTS | 1 | 2 | 1 | 2 | 2 | 2 | 1 | 2 | 2 | 1 |

The TDD UL/DL configurations in TABLE 1 provide 40% and 90% of DL SFs per system frame. Despite this flexibility, a semi-static TDD UL/DL configuration that can be updated every 640 msec or less frequently by SIB may not match well with short term data traffic conditions. For this reason, faster adaptation of a TDD UL/DL configuration is considered to improve system throughput especially for a low or moderate number of connected UEs. For example, when there is more DL traffic than UL traffic, a TDD UL/DL configuration can be adapted to include more DL SFs. Signaling for faster adaptation of a TDD UL-DL configuration can be provided by several means including a PDCCH (see also REF 3). An operating constraint in an adaptation of a TDD UL/DL configuration by means other than SIB is an existence of UEs that cannot be aware of such adaptation, for example UEs that do not support communication with dynamic adaptation of an UL/DL configuration. Since UEs perform measurements in DL SFs of the UL/DL configuration indicated by SIB, such DL SF cannot be changed to UL SFs or to special SFs by a faster adaptation of a TDD UL/DL configuration. However, an UL SF can be changed to a DL SF as eNB 102 can ensure that UEs that are not aware of an adapted UL/DL configuration do not transmit any signals in such UL SFs.

A DL SF can be a unicast SF or it can be a multicast-broadcast single frequency network (MBSFN) SF. Each DL SF (including a DwPTS of a special SF in case of TDD) is typically divided into a control region, including first few SF symbols, and a data region including a remaining SF symbols. A unicast DL SF has a control region of 1, 2, or 3 symbols (or 2, 3, or 4 symbols for small DL operating BWs) while an MBSFN SF has a unicast control region of one or two SF symbols followed by an MBSFN region having contents that depend on a usage type for the MBSFN SF. Information about a set of SFs configured as MBSFN SFs in a cell is provided in a SIB. In principle, an arbitrary pattern of MBSFN SFs can be configured with a pattern repeating after 40 msec. However, SFs where information necessary to operate a network (specifically, synchronization signals, system information, and paging) needs to be transmitted cannot be configured as MBSFN SFs. Therefore, SF0, SF4, SF5, and SF9 for FDD and SF0, SF1, SF5, and SF6 for TDD are unicast SFs and cannot be configured as MBSFN SFs (see also REF 3 or REF 5).

In time domain multiplexing (TDM) for inter-cell interference coordination (ICIC), other than regular SFs, another type of SF, referred to as almost blank SF (ABS), can be used in order to mitigate inter-cell interference (see also REF 3 and REF 5). In ABS, eNB 102 can assume that an interfering eNB does not transmit signaling in all SF symbols other than a first symbol. Compared to a regular SF, a transmission power from an interfering eNB in an ABS can be considerably reduced. In order to obtain performance benefits from TDM-ICIC, eNB 102 scheduler uses ABS patterns at interfering transmitting nodes in order to perform a link adaptation. In FDD, an ABS pattern is periodic with a period that is an integer multiple of 40 SFs (4 system frames). In TDD, the ABS pattern period depends on a respective TDD UL-DL configuration. ABS patterns are configured and signaled between nodes over an X2 interface or via a HeNB gateway when an X2 interface is not available. Since a period of an ABS pattern is an integer multiple of 40 msec, X2 signaling uses a bit-map of a same length as the ABS pattern.

Machine type communications (MTC) or Internet of Things (IoT) refers to communication of automated devices in a network. MTC through cellular networks is emerging as a significant opportunity for new applications in a networked world where devices communicate with humans and with each other. Compared to typical human communication, MTC typically has relaxed latency and quality of service (QoS) requirements and often does not require mobility support. MTC can be used for a wide variety of applications in different sectors including healthcare, such as monitors, industrial, such as safety and security, energy, such as meters and turbines, transport, such as fleet management and tolls, and consumer and home, such as appliances and power systems.

An important requirement for commercial success of MTC is for respective UEs to have low power consumption and significantly lower cost than for UEs serving human communications. Cost reduction for low cost UEs (LC UEs), relative to UEs serving human communication, can be achieved, among other simplifications, by constraining a transmission BW and a reception BW to a small value, such as 6 RBs, of an UL system BW or a DL system BW, respectively, by reducing a data TB a LC UE transmits or receives, relative to a non-LC UE, or by implementing one receiver antenna instead of two receiver antennas.

LC UEs can be installed in basements of residential buildings or, generally, in locations where a LC UE experiences a large path-loss loss and poor coverage due to a low signal to noise and interference ratio (SINR). LC UE design selections of one receiver antenna and reduced maximum power amplifier gain can also result to coverage loss even when a LC UE does not experience a large path-loss Due to such reasons, a LC UE can require operation with enhanced coverage (EC). In extreme poor coverage scenarios, LC UEs may have characteristics such as very low data rate, greater delay tolerance, and limited mobility. Not all LC UEs require coverage enhancement (CE) (LC/CE UEs) or a same amount of CE. In addition, in different deployment scenarios, a required CE level can be different for different eNBs, for example depending on a eNB transmission power or on an associated cell size or on a number of eNB receiver antennas, as well as for different LC/CE UEs, for example depending on a location of a LC/CE UE.

LC/CE UE 114 or eNB 102 can support CE by repeating transmissions of channels either in a time domain or in a frequency domain. LC/CE UE 114 operating with CE can be configured by eNB 102 with a CE level corresponding to a number of SFs for a transmission or reception of a respective channel (number of repetitions for a transmission of a channel). For example, LC/CE UE 114 can be configured by eNB 102 a first number of repetitions for reception of a PDSCH transmission, a second number of repetitions for a PUSCH transmission, and so on.

A DL control channel for LC/CE UE 114 is assumed to be based on the EPDCCH structure and will be referred to as MPDCCH. In order to reduce a number of repetitions that LC/CE UE 114 needs to receive a PDSCH or an MPDCCH, respective transmissions can be over all RBs where LC/CE UE 114 can receive in a SF, such as in a sub-band of 6 contiguous RBs, as eNB 102 is assumed to not be power limited. Conversely, as LC/CE UE 114 increases a transmission power when configured to transmit an UL channel with repetitions in order to increase a power spectral density, the UL channel transmission from LC/CE UE 114 can be limited to 1 RB or less than 1 RB per SF.

In order to improve frequency diversity for a transmission and reduce an associated number of repetitions for a target reception reliability, frequency hopping can apply to the transmission where, for example, a first number of repetitions are in a first sub-band and a second number of repetitions are in a second sub-band. Frequency hopping can be particularly beneficial in reducing a number of repetitions used or required to provide a target reliability for a SIB1 transmission to LC/CE UEs, as a SIB1 for LC/CE UEs (referred to as SIB1bis or as LC-SIB1) typically includes data with relatively large transport block size (TBS). As different sub-bands can correspond to different sets of 6 contiguous RBs, transmission with frequency hopping requires a LC/CE UE to re-tune its radio-frequency (RF) to each respective sub-band. This re-tuning introduces a delay that is typically up to two SF symbols, depending on the implementation. During a RF re-tuning period, a LC/CE UE is not expected to be capable of transmitting or receiving.

Transmissions of physical channels with repetitions to or from LC/CE UEs need to also avoid SFs where they can introduce interference to other transmissions or be subject to interference from other transmissions. For example, repetitions of transmissions to LC/CE UEs or from LC/CE UEs need to be avoided in UL SFs of a TDD system or in ABS or MBSFN SFs, or in normal SFs to enable eNB 102 to transmit or receive from non-LC UEs.

Therefore, there is a need to support repetitions for a PBCH transmission conveying a MIB to LC/CE UEs.

There is another need for LC/CE UEs to determine a TBS, SFs, and sub-bands for repetitions of a SIB1bis transmission.

Finally, there is another need to support repetitions for a channel transmission from or to a LC/CE UE in a number of consecutive SFs where in some of the SFs the repetitions are not transmitted.

Certain embodiments of this disclosure provide mechanisms for supporting repetitions of a PBCH transmission from eNB 102. Certain embodiments of this disclosure also provide mechanisms for determining a TBS, SFs, and sub-bands for repetitions with frequency hopping for a PDSCH conveying a SIB1bis. Additionally, certain embodiments of this disclosure provide mechanisms for indicating subframes where repetitions for a transmission are transmitted and subframes where repetitions for a transmission are not transmitted.

The following embodiments are not limited to LC/CE UEs and can be applicable to any type of UEs requiring coverage enhancements. This includes UEs that can receive over the entire DL system BW or transmit over the entire UL system BW at a given time instance (referred to as non-LC UEs). MPDCCH or PDSCH transmission to a LC/CE UE and PUCCH or PUSCH transmissions from a LC/CE UE are assumed to be with repetitions, including no repetitions, in a number of SFs.

Various embodiments of the disclosure provide for transmission and reception of a master information block to LC/CE UEs (LC-MIB).

A MIB for LC/CE UEs is referred to as LC-MIB and a SIB for a LC/CE UE is referred to as LC-SIB. A LC-MIB can utilize spare bits of an existing MIB for non-LC UEs to provide scheduling information for a LC-SIB1 transmission. As LC/CE UE 114 is not aware of an UL/DL configuration in case of a TDD system or, in general, of ABS or MBSFN SFs when LC/CE UE 114 attempts to detect a LC-MIB, the LC-MIB transmission needs to occur only in SFs that are guaranteed to be DL SFs regardless of the UL/DL configuration or of the presence of ABS or MBSFN SFs. For LC-MIB transmission, LC/CE UE 114 can assume that a DL control region for non-LC UEs spans 3 SF symbols. This represents a maximum number of SF symbols for the DL control region for all DL system BWs except for small DL system BWs (see also REF 1). However, for small DL system BWs, as only limited DL scheduling (if any) can exist in SFs with LC-MIB transmission, 3 SF symbols are adequate for the DL control region without imposing adverse scheduling restrictions.

SF0 includes a MIB transmission for non-LC UEs and, for a FDD system, SF0 can also include transmission of PSS and SSS. Then, after also excluding SF symbols for a DL control region, remaining SF symbols in middle 6 RBs of a DL system BW are few (7 SF symbols in TDD, 5 SF symbols in FDD), and the middle 6 RBs cannot be efficiently used for PDSCH or MPDCCH transmissions. Therefore, when eNB 102 supports CE for a LC-MIB, eNB 102 can transmit a PBCH conveying LC-MIB in the remaining symbols of SF0. To provide additional CE for the LC-MIB, eNB 102 can also transmit repetitions of a LC-MIB transmission in an additional SF. In one example, as resources used for LC-MIB repetitions in additional SFs can be used for PDSCH or for MPDCCH transmissions, LC-MIB repetitions can be intermittent in order to control respective overhead. This can be an implementation aspect for eNB 102. For example, eNB 102 can align DRX patterns for LC/CE UEs requiring large CE with intermittent repetitions for a LC-MIB when eNB 102 schedules updates for system information. Therefore, the eNB 102 implementation can apply a mixture of continuous repetitions for a LC-MIB in SF0 and of intermittent repetitions for a LC-MIB transmission in one or more additional SFs.

Figure 12:
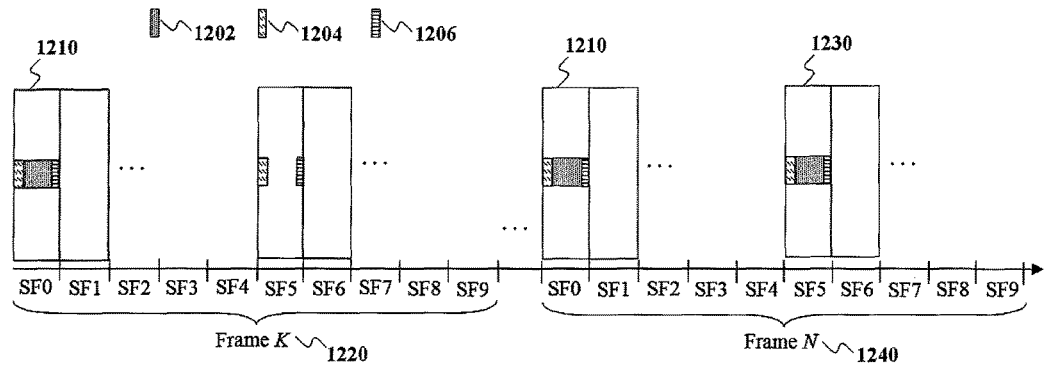
FIG. 12 illustrates a transmission of a LC-MIB with repetitions continuously in SF0 and intermittently in SF5 for a TDD system according to this disclosure.

FIG. 12 illustrates a transmission of a LC-MIB with repetitions continuously in SF0 and intermittently in SF5 for a TDD system according to this disclosure.

The eNB 102 transmits a LC-MIB 1202 in the SF symbols of every SF0 1210 other than SF symbols reserved for a DL control region 1204 and a SF symbol reserved for SSS transmission 1206. In system frame K 1220, no other SF includes repetitions of the LC-MB. After a number of system frames, eNB 102 transmits repetitions of a LC-MIB transmission in both SF0 and SF5 1230 of system frame N 1240. A MIB for non-LC UEs is transmitted in SF0. A MIB for non-LC UEs can convey same contents as a LC-MIB and in that case the MIB can be considered as a repetition of the LC-MIB. A similar structure can apply for a FDD system.

Indication by a LC-MIB of a CE level that eNB 102 supports can be beneficial for LC/CE UE 114 in determining a number of repetitions for a transmission of a first LC-SIB (LC-SIB1). A number of repetitions for a LC-SIB1 (SIB1bis) transmission within a given period can be indicated by a LC-MIB. As a difference in a number of repetitions for LC-SIB1 transmission between a large CE level and no CE (or a small CE level) can be in the hundreds, assuming a reduced or minimum number of LC-SIB1 repetitions corresponding to a smallest CE level (when a number of LC-SIB1 repetitions is not indicated in the LC-MIB) can significantly prolong system access time and waste power for LC/CE UE 114. Also, forcing eNB 102 to transmit LC-SIB1 with a maximum or increased number of repetitions corresponding to a largest CE level is wasteful in terms of spectral efficiency for the eNB when a smaller than the increased or maximum CE level needs to be supported by eNB 102 in a cell.

When eNB 102 supports CE, LC/CE UE 114 can also determine that LC/CE UE 114 can communicate with eNB 102 in case CE is not supported for non-LC UEs as in such case an indication for CE support can also be an indication for communication support with LC/CE UEs. When eNB 102 indicates support for a non-zero CE level, for example through a number of LC-SIB1 repetitions for a respective LC-SIB1 TBS, LC/CE UE 114 can interpret this indication as eNB 102 supporting communication with LC/CE UEs. When an indicated supported CE level is zero, LC/CE UE 114 can continue with an attempt to detect LC-SIB1 in order to determine whether or not eNB 102 supports LC/CE UEs (a respective indication is then provided in LC-SIB1).

When PBCH repetitions for a LC-MIB are transmitted in two SFs, with SF0 that conveys a PBCH to non-LC UEs being one of the two SFs then, due to a frequency offset generated from imperfect local oscillators at eNB 102 and at LC/CE UE 114, coherent combining of repetitions can be more reliable when the second SF is an adjacent SF to SF0. This can also allow for frequency offset correction through correlation of identical repetitions of a PBCH transmission in different symbols. For FDD, SF9 can be selected but the SFN-dependent aspects of a repetition (PBCH scrambling and SFN information in a respective LC-MIB) are based on the ones for the next system frame in order to be possible to combine the PBCH repetitions with the ones in SF0 of the next system frame.

For TDD, in a first example, SF1 can be selected. Even though SF1 is a special SF, a DwPTS length can be assumed to be large enough, such as 9 symbols, to accommodate PBCH repetitions. This assumption can be reasonable because a DwPTS length of 3 symbols (or 6 symbols) is designed to provide a large guard period to accommodate operation in cell sizes near 100 Km. This represents an unlikely operating scenario for CE operation. It is also possible for the eNB 102 implementation to not utilize the last 1-2 symbols of SF1 for UpPTS in order to provide additional guard period. In a second example, SF5 can be selected.

Figure 13:
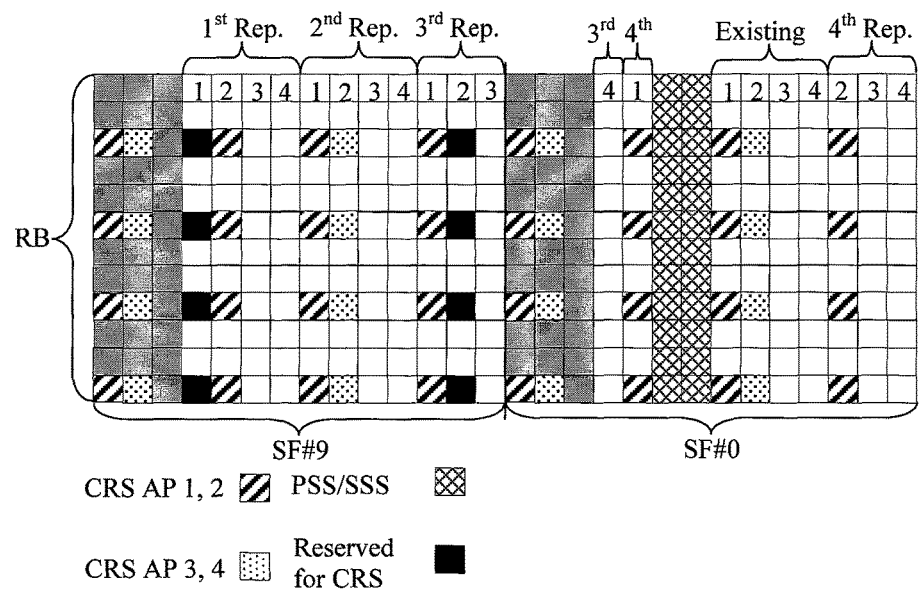
FIG. 13 illustrates a mapping for PBCH repetitions conveying a LC-MIB in SF9 and SF0 of a FDD system according to this disclosure.

FIG. 13 illustrates a mapping for PBCH repetitions conveying a LC-MIB in SF9 and SF0 of a FDD system according to this disclosure.

There are four repetitions of a PBCH transmission conveying a LC-MIB, spanning SF9 of a previous system frame and SF0 of a current system frame, in addition to an existing PBCH repetition for non-LC UEs. The symbols of an existing PBCH transmission for non-LC UEs are repeated in the each repetition. To enable an integer number of repetitions for a PBCH transmission, REs are reserved for CRS transmission (see also REF 6).

Figure 14:
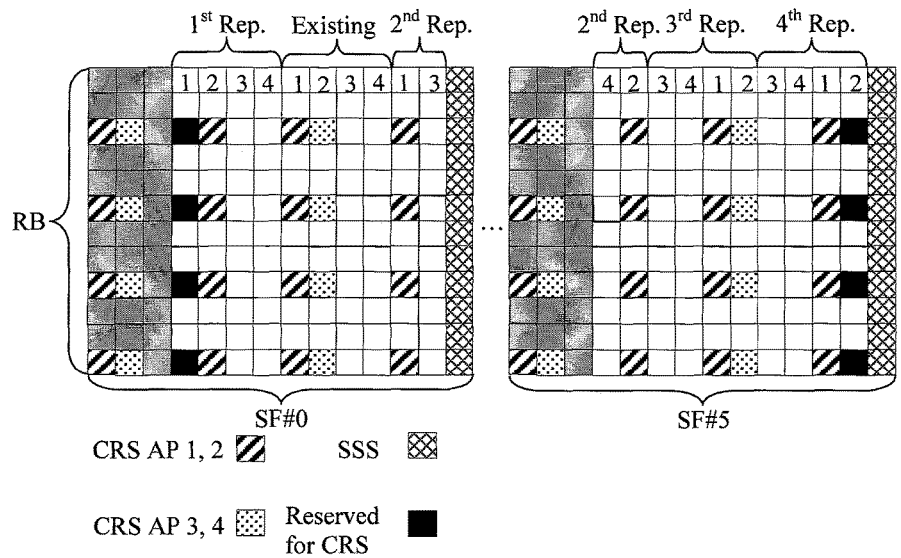
FIG. 14 illustrates a mapping for PBCH repetitions conveying a LC-MIB in SF0 and SF5 of a TDD system according to this disclosure.

FIG. 14 illustrates a mapping for PBCH repetitions conveying a LC-MIB in SF0 and SF5 of a TDD system according to this disclosure.

There are four repetitions of a PBCH transmission conveying a LC-MIB, spanning SF0 and SF5 of a same system frame, in addition to an existing PBCH repetition for non-LC UEs. The symbols of an existing PBCH transmission for non-LC UEs are repeated in the each repetition. To enable an integer number of repetitions for a PBCH transmission, REs are reserved for CRS transmission (see also REF 6).

Various embodiments of the disclosure provide for transmission and reception of system information blocks to LC/CE UEs (LC-SIBs).

After LC/CE UE 114 detects a LC-MIB, LC/CE UE 114 proceeds to detect one or more LC-SIBs. For a LC-SIB transmission with repetitions, as LC/CE UE 114 is not aware of ABS or MBSFN SFs or, for a TDD system, of an UL/DL configuration in a system frame, a first LC-SIB (LC-SIB1) transmission can occur only in SFs that are guaranteed to be DL SFs. These SFs include SF0 and SF5 in every system frame. In order to reduce a time used or required to transmit LC-SIB1, and as a SIB1 for non-LC UEs is transmitted in SF5 of even system frames (see also REF 5), SF4 and SF9 can be used, instead of or in addition to SF0 or SF5 for a FDD system. For a TDD system, SF1 and SF6 can be used under an assumption for a large DwPTS length such as 9 symbols; otherwise, SF1 and SF6 cannot be used for repetitions of a LC-SIB transmission for a TDD system and only SF0 and SF5 can be used.

When subframes other than SF0 and SF5 are used for LC-SIB1 transmission in a TDD system, in a first example a reduced or minimum DwPTS length across special SF configurations, such as a DwPTS length of 3 SF symbols in REF 1, can be assumed In a second example, for better utilization of special SFs for LC-SIB1 transmission, LC/CE UE 114 can assume a larger DwPTS length, such as 7 SF symbols or 9 SF symbols. Whether LC/CE UE 114 can assume availability of SF1 and SF6, with a DwPTS such as 9 SF symbols, for a LC-SIB1 transmission can be explicitly indicated in a LC-MIB using 1 bit. In a third example, repetitions of a LC-SIB1 transmission can occur in additional predetermined SFs when these SFs happen to be DL SFs, such as SF8 or SF9, and LC/CE UE 114 can blindly detect LC-SIB1 according to a respective number of hypotheses. For example, a first hypothesis can be that LC-SIB1 is transmitted only in SF0 and SF5 and a second hypothesis can be that LC-SIB1 is transmitted in SF0, SF5, and SF9.

LC-SIB1 can include information of SFs that are configured as ABS or MBSFN SFs and, for a TDD system, LC-SIB can also include information for an UL/DL configuration. Then, after detection of LC-SIB1, repetitions of other PDSCH or MPDCCH transmissions can be in DL SFs or special SFs that are not configured as ABS or MBSFN SFs or in special SFs that have a DwPTS size larger than 3 SF symbols and support MPDCCH transmissions with a same manner of enhanced control channel elements (ECCEs) as in normal SFs (see also REF 1). In general, LC-SIB1 can include information where repetitions of a PDSCH or of a MPDCCH transmission can occur.

Figure 15:
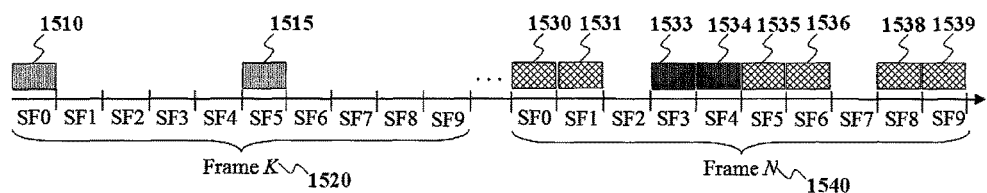
FIG. 15 illustrates a transmission of a LC-SIB1 with repetitions in a first PDSCH and a transmission of a subsequent LC-SIB or of subsequent data with repetitions in a second PDSCH according to this disclosure.

FIG. 15 illustrates a transmission of a LC-SIB1 with repetitions in a first PDSCH and a transmission of a subsequent LC-SIB or of subsequent data with repetitions in a second PDSCH according to this disclosure.

In a TDD system, the eNB 102 transmits a LC-SIB1 and LC/CE UE 114 receives the LC-SIB1 only in SF0 1510 and in SF5 1515 in a number of system frames such as system frame K 1520. The LC-SIB1 includes, explicit or implicit, information for configurations of ABS and MBSFN SFs and for an UL/DL configuration. A bit-map, such as for example of 10 bits or 40 bits, in a LC-SIB1 can indicate SFs per system frame that are not available for repetitions of a PDSCH transmission or of a MPDCCH transmission or, equivalently, SFs per system frame that are available for repetitions of a PDSCH transmission or of a MPDCCH transmission. LC/CE UE 114 uses the information for the configuration of DL SFs that can support repetitions of PDSCH/MPDCCH transmissions to determine DL SFs, or special SFs for a TDD system, for subsequent reception of repetitions of a PDSCH transmission or of MPDCCH transmission. For example, for a TDD system where LC-SIB1 indicates DL SFs for repetitions of a PDSCH transmission or of MPDCCH transmission according to UL/DL configuration 2, LC/CE UE 114 determines that reception of repetitions for a PDSCH transmission can be in SF0 1530, SF1 1531, SF5 1535, SF6 1536, SF8 1538 and SF9 1539 in a system frame N 1540. LC/CE UE 114 also determines that SF3 1533 and SF4 1534 are ABS or MBSFN SFs or, in general, SFs that do not support repetitions of a PDSCH transmission and LC/CE UE 114 does not receive repetitions of a PDSCH/MPDCCH transmission in SF3 1533 and SF4 1534.

For a LC-SIB transmission or, in general, for any transmission of a DL channel or an UL channel configured to occur with R repetitions and in S sub-bands of a system BW, one possible pattern for repetitions is that $\lfloor R/S \rfloor$ consecutive repetitions occur in each sub-band except for one sub-band, such as the sub-band with the first repetition, where $\lceil R/S \rceil$ consecutive repetitions can occur. This pattern can apply in case successive repetitions of a LC-SIB transmission are in successive available SFs as this pattern can increase or maximize a number of RS REs that can be filtered at a receiver in order to improve channel estimation and can reduce or minimize a delay associated with a LC/CE UE re-tuning to transmit or receive in each of the S sub-bands. For a TDD system, a hopping pattern can be adjusted so that sub-band switching occurs during a SF having an opposite direction than a transmission direction in order to effectively avoid an associated re-tuning delay. For example, for a PUSCH transmission with repetitions, sub-band switching can occur during a DL SF.

As a LC-SIB needs to be transmitted with repetitions in a PDSCH, each repetition is transmitted in a sub-band of 6 RBs and data information in the LC-SIB is modulated using QPSK. In order for LC/CE UE 114 to detect a LC-SIB transmission, LC/CE UE 114 needs to be informed of the LC-SIB TBS, or of the LC-SIB MCS and a number of repetitions, and of the SFs and RBs for the repetitions of the LC-SIB transmission. As different contents of a LC-SIB can require different update rates and as different operators can choose to provide different LC-SIB contents, it is detrimental to transmit a LC-SIB with an increased or maximum TBS as this can result to transmission of unnecessary information and use or require a larger number of repetitions than necessary when an actual LC-SIB TBS is smaller than the increased or maximum one. For this reason, this disclosure considers that a TBS for LC-SIB1 is indicated by spare bits in a LC-MIB. In one example, a set of four or eight LC-SIB1 TBS can be specified in a system operation and two or three spare bits in the LC-MIB can be used to indicate one of the four or eight TBS for LC-SIB1, respectively. In another example, LC/CE UE 114 can determine a number of repetitions for a LC-SIB1 transmission based on an indicated TBS where more repetitions are used for a larger TBS and a relationship between number of repetitions and TBS can be predetermined. In another example, one or more spare bits in a LC-MIB can indicate one of predetermined numbers of repetitions for a LC-SIB1 transmission. TBS, sub-bands, and numbers of repetitions for transmissions of LC-SIBs other than LC-SIB1 can be indicated by LC-SIB1.

In one example, a number of SFs used for repetitions of a LC-SIB1 transmission per minimum system information modification period, such as 8 system frames (see also REF 5), can be indicated by spare bits in a LC-MIB or can be predetermined in a system operation. In another example, a number of SFs used for repetitions of a LC-SIB1 transmission can be linked, through a one-to-one mapping, to a LC-SIB1 TBS that can be indicated in the LC-MIB. For example, a smaller total number of SFs can be derived by LC/CE UE 114 when a smaller LC-SIB1 TBS is indicated by the LC-MIB. In one example, a derivation for the number of repetitions for a LC-SIB1 transmission from a LC-SIB TBS can be by a predefined mapping in a system operation. In another example, a derivation for the number of repetitions for a LC-SIB1 transmission can be explicitly indicated by a LC-MIB.

Once LC/CE UE 114 determines a LC-SIB1 TBS and the possible SFs per system frame for repetitions of a LC-SIB1 transmission, for example as it was previously described for a FDD system and for a TDD system, LC/CE UE 114 needs to determine a first SF in a number of system frames, such as 8 system frames, for repetitions of a LC-SIB1 transmission. LC/CE UE 114 can implicitly determine the first SF in the number of system frames by a SFN and by a total number of SFs in the number of system frames for repetitions of the LC-SIB1 transmission (remaining SFs, after the first SF, can be predetermined based on the first SF). A PCID for eNB 102 that LC/CE UE 114 determines after acquiring PSS/SSS can also be included in a determination of a first SF (per system information modification period) for repetitions of a LC-SIB1 transmission in order to provide a cell-specific offset for eNB 102.

LC/CE UE 114 can determine sub-bands of 6 consecutive RBs for repetitions of a LC-SIB1 transmission from a first sub-band of 6 consecutive RBs used for a first repetition and by a frequency hopping pattern for the repetitions of the LC-SIB1 transmission. The first sub-band can be determined from the PCID and the DL system BW. Collisions of LC-SIB1 transmissions from different eNBs are possible but a probability can be reduced when the frequency hopping pattern is also dependent on a SFN, that is, when a time/frequency dependence on the PCID applies instead of only a frequency dependence.

In a first approach, when a frequency hopping pattern for repetitions of a LC-SIB1 transmission results to a repetition being transmitted in a sub-band that at least partially overlaps with a sub-band (6 RBs) used for a repetition of a PBCH transmission in a respective SF, LC/CE UE 114 can ignore the sub-band for the repetition of the LC-SIB1 transmission and assume that the repetition of the LC-SIB1 transmission is transmitted in the next sub-band, according to the frequency hopping pattern, that does not overlap with the sub-band for the repetition of the PBCH transmission in the respective SF.

In a second approach, the middle two sub-bands in a DL system BW that overlap with the middle 6 RBs of the DL system BW in SFs where repetitions of a PBCH transmission occur are excluded from the sub-bands available for frequency hopping of repetitions for a LC-SIB1 transmission.

In general, the larger a number of sub-bands used for frequency hopping (FH) of repetitions for a LC-SIB1 transmission, the better the LC-SIB1 reception reliability particularly in case of absence of receiver antenna diversity at LC/CE UE 114. In practice, it can often be difficult for eNB 102 to use more than 2 sub-bands for a LC-SIB1 transmission at least due to preconfigured semi-persistent (SPS) PDSCH RBs and EPDCCH RBs for non-LC UEs, that also need to be distributed for frequency diversity, and due to preconfigured/predetermined sub-bands for MPDCCH transmissions. Also, the middle 2 sub-bands need to be avoided as, in some (for FDD) or all (for TDD) SFs where LC-SIB1 can be transmitted, the middle 2 sub-bands overlap with LC-MIB or with SCH transmissions. However, for large system BWs such as 20 MHz or for low traffic periods, it can be possible to use 4 sub-bands for a LC-SIB1 transmission to reduce a used or required number of repetitions and improve inter-cell interference randomization.

Sub-bands for repetitions of a LC-SIB1 transmission cannot pseudo-randomly hop over all sub-bands of a DL system BW as the LC-SIB1 transmission needs to co-exist with non-dynamically adjusted transmissions (such as SPS PDSCH, EPDCCH, MPDCCH, LC-MIB, SCH). Therefore, although a sub-band used for a LC-SIB1 repetition in a SF can depend on the SF or the SFN and the PCID of eNB 102, a set of possible sub-bands needs to be a subset of all sub-bands and be predetermined. This can be by specification or by implicit means (for example based on the PCID for a given number of available sub-bands in a DL system BW), or by explicit means (for example, by LC-MIB indication). As there is no need for flexible selection of sub-bands for repetitions of a LC-SIB1 transmission, the sub-bands can be predefined and a set of 2 sub-bands or 4 sub-bands, depending on the DL system BW, can be selected based on the PCID and the SFN.

Signaling a number of repetitions (periodicity) for a LC-SIB1 transmission per number of system frames in a LC-MIB allows eNB 102 to trade-off LC-SIB1 overhead (within the time period for the number of system frames) and LC-SIB1 detection latency. Even though a single nominal value can be predetermined in a system operation, it is desirable to allow eNB 102 to control this trade-off considering a variety of deployment scenarios; 3 values for a periodicity of a LC-SIB1 transmission corresponding to twice per system frame, once per system frame, or once per two system frames, can suffice.

Therefore, LC-MIB signaling for scheduling a LC-SIB1 transmission needs to include one or more of: TBS, number of sub-bands (2 or 4) for repetitions unless determined by the DL system BW as it was previously described (2 sub-bands for the smaller DL system BWs and 4 sub-bands for the larger DL system BWs), number of repetitions per period of system frames and possibly, for a TDD system, whether SF1 and SF6 are available. Dependencies can be exploited to reduce a number of combinations and consequently a number of used or required spare bits in a LC-MIB for the signaling. For example, one or more of the following can apply.

a) For small LC-SIB1 TBS, a shortest periodicity for repetitions (largest number of repetitions per number of system frames) need not be supported as an increased or maximum LC-SIB1 acquisition time can still be smaller than for medium/large TBS with the shortest periodicity for repetitions.
b) For small LC-SIB1 TBS, indicating a smaller number of repetitions per number of system frames can be avoided as additional UE power consumption is small.
c) For large LC-SIB1 TBS, shorter periodicities, through larger number of repetitions per number of system frames, can be considered in order to avoid a long acquisition time.

TABLE 3 provides a mapping for 5 spare bits in a LC-MIB. At a minimum, 4 spare bits in LC-MIB can indicate a TBS and a periodicity (number of repetitions per given number of system frames) for a LC-SIB1 transmission. Using 1 additional bit to also indicate a number of sub-bands and a number of repetitions can be a beneficial trade-off and associated restrictions are not expected to have any meaningful impact on a system operation.

TABLE 3

LC-MIB signaling Information

| Value of 5 Bits | TBS | Repetitions per 8 system frames |
|---|---|---|
| 00000 | Small1 | 4 |
| 00001 | Small1 | 8 |
| 00010 | Small2 | 4 |
| 00011 | Small2 | 8 |
| 00100 | Medium1 | 4 |
| 00101 | Medium1 | 8 |
| 00110 | Medium1 | 16 |
| 00111 | Medium2 | 4 |
| 01000 | Medium2 | 8 |
| 01001 | Medium2 | 16 |
| 01010 | Medium3 | 4 |
| 01011 | Medium3 | 8 |
| 01100 | Medium3 | 16 |
| 01101 | Medium4 | 4 |
| 01110 | Medium4 | 8 |
| 01111 | Medium4 | 16 |
| 10000 | Large1 | 4 |
| 10001 | Large1 | 8 |
| 10010 | Large1 | 16 |
| 10011 | Large2 | 8 |
| 10100 | Large2 | 16 |
| 10101 | Large3 | 8 |
| 10110 | Large3 | 16 |
| 10111 | Large4 | 8 |
| 11000 | Large4 | 16 |
| 11001 | Reserved | Reserved |
| 11010 | Reserved | Reserved |
| 11011 | Reserved | Reserved |
| 11100 | Reserved | Reserved |
| 11101 | Reserved | Reserved |
| 11110 | Reserved | Reserved |
| 11111 | Reserved | Reserved |

For subsequent DL transmissions to LC/CE UE 114, a LC-SIB1 or another LC-SIB can indicate a set of SFs where DL transmissions can occur. For example, this set of SFs can exclude ABS or actual MBSFN SFs. For ABS SFs periodicity of 4 system frames, a bit-map of 40 bits can indicate valid DL SFs available repetitions of DL transmissions to LC/CE UE 114. Further considering that 4 SFs per system frame are valid DL SFs for DL transmission to LC/CE UE 114, that is SF0, SF4, SF5, and SF9 in FDD and SF0, SF1, SF5, and SF6 in TDD, an optimization can be a bit-map of 24 bits for the remaining DL SFs over 4 system frames to indicate valid SFs for repetitions of DL transmissions to LC/CE UE 114 (for example, a binary value of '0' can indicate a valid SF). Similar, for a TDD system applying an adaptive UL/DL configuration, the valid SFs for UL transmissions from LC/CE UEs can be indicated by the DL-reference UL/DL configuration (see also REF 3) where SF2 can be assumed to support UL transmissions.

In particular, the following parameters can be defined to describe repetitions for a LC-SIB1 transmission.

a) $T_{SIB1bis}$ is a LC-SIB1 transmission period that can be predetermined in a system operation; for example, $T_{SIB1bis}=8$ system frames. $T_{SIB1bis}$ is occasionally referred to as system information modification period.
b) $R_{SIB1bis} \geq 1$ is a number of repetitions of a LC-SIB1 transmission every LC-SIB1 transmission period $T_{SIB1bis}$.
c) $F_{SIB1bis}$ is a number of sub-bands (SBs) for hopping of repetitions of a LC-SIB1 transmission; for example, $F_{SIB1bis}=2$ for a DL system BW of 5 MHz that includes 6 sub-bands (or 4 sub-bands when the middle two sub-bands are excluded from being used for repetitions of a LC-SIB1 transmission).
d) $Q_{SIB1bis}$ is a number of LC-SIB1 repetitions per system frame. $Q_{SIB1bis}$ can be fractional in case there is one LC-SIB1 repetition per $1/Q_{SIB1bis}$ system frames. For example, $Q_{SIB1bis}=1$ when repetitions of a LC-SIB1 transmission are only in one SF of every system frame, $Q_{SIB1bis}=\frac{1}{2}$ when repetitions of a LC-SIB1 transmission are only in one of every two system frames, and $Q_{SIB1bis}=2$ when repetitions of a LC-SIB1 transmission are in two SFs of every system frame. Depending on the approach to describe repetitions of a LC-SIB1 transmission, $Q_{SIB1bis}$ can be unnecessary and $R_{SIB1bis}$ can suffice.
e) $N_{SB}^{DL}$ is a number of SBs in a DL system BW that are available for repetitions of a LC-SIB1 transmission. The number of SBs can include all SBs in the DL system BW, or can exclude the middle 2 SBs to avoid overlapping with PBCH/SCH transmissions in the middle 6 RBs of the DL system BW when repetitions of a LC-SIB1 transmission can be in same SF as repetitions of a PBCH transmission or as in a same SF as SCH transmission, or can additionally exclude other predetermined SBs such as SBs with odd index (or even index), in order to ensure that such SBs can be used by RRC configured transmissions, such as SPS PDSCH or EPDCCH/MPDCCH, while avoiding interference by repetitions of a LC-SIB1 transmission. The SBs are indexed in an ascending order according to the indexes of the six RBs contained in each sub-band.
f) $N_{ID}^{cell}$ is a PCID of a cell for eNB 102.

SBs for repetitions of a LC-SIB1 transmission in case of hopping over $F_{SIB1bis}=4$ SBs can be determined as the ones with index $Y_k^{SB}$, $(Y_k^{SB}+N_{SB}^{DL}/4) \bmod N_{SB}^{DL}$, $(Y_k^{SB}+2 \cdot N_{SB}^{DL}/4) \bmod N_{SB}^{DL}$, and $(Y_k^{SB}+3 \cdot N_{SB}^{DL}/4) \bmod N_{SB}^{DL}$, in case $N_{SB}^{DL}/4$ is an integer or, in general, as $Y_k^{SB}$, $(Y_k^{SB}+\lfloor N_{SB}^{DL}/4 \rfloor) \bmod N_{SB}^{DL}$, $(Y_k^{SB}+2 \cdot \lfloor N_{SB}^{DL}/4 \rfloor) \bmod N_{SB}^{DL}$, and $(Y_k^{SB}+3 \cdot \lfloor N_{SB}^{DL}/4 \rfloor) \bmod N_{SB}^{DL}$, where $\lfloor \ \rfloor$ is a floor function that rounds a number to an integer that is immediately smaller than the number. For $F_{SIB1bis}=2$ SBs, the indexes of the 2 SBs are $Y_k^{SB}$ and $(Y_k^{SB}+\lfloor N_{SB}^{DL}/2 \rfloor) \bmod N_{SB}^{DL}$. In case the four SBs for $F_{SIB1bis}=2$, or the two SBs for $F_{SIB1bis}=2$, vary over time, $Y_k^{SB}=((A \cdot Y_{k-1}^{SB}) \bmod D) \bmod N_{SB}^{DL}$, $Y_{k-1}^{SB}=N_{ID}^{cell}$, $A=39827$, $D=65537$ and $k=\lfloor Q_{SIB1bis} \cdot SFN/F_{SIB1bis} \rfloor$. In case the four SBs for $F_{SIB1bis}=4$, or the two SBs for $F_{SIB1bis}=2$, do not vary over time, $Y_k^{SB}=Y_{k-1}^{SB} \bmod N_{SB}^{DL}=N_{ID}^{cell} \bmod N_{SB}^{DL}$ (no dependence of $Y_k^{SB}$ on k).

Regardless of a SB hopping pattern for repetitions of a LC-SIB1 transmission, a number of patterns can be much smaller than a number of PCIDs and interference among repetitions in adjacent cells of corresponding eNBs is probable when a same SF is used for the repetitions. For example, use of same SBs among adjacent cells is unavoidable for the smaller system BWs of 3 MHz and 5 MHz while for a largest system BW of 20 MHz there are only 16 (or 14 when the 2 middle SBs are not used) indexes for a starting SB while there are 504 PCIDs. Therefore, interference randomization can also be considered in the time domain.

To simplify a design, a same principle as for a selection of SBs can be considered for a selection of SFs for repetitions of a LC-SIB1 transmission. The SFs can have a same separation in time within each unit of $T_{SIB1bis}$ system frames. Available SFs for repetitions of a LC-SIB1 transmission can be one or more of {0, 4, 5, 9} for FDD and of {0, 5} or of {0, 1, 5, 6} for TDD.

Signaling in a LC-MIB to schedule repetitions of a LC-SIB1 transmission can be enhanced by considering the following observations:

a) For an increased or maximum TBS of 1000 bits for a LC-SIB1, only the first 24 entries from TABLE 4 (Table 7.1.7.2.3-1 in REF 3) are applicable. Using 5 bits for a LC-SIB1 TBS is excessive particularly as TBS values for many entries are similar. Selecting, for example, every third entry can reduce a used or required number of bits to 3 but a percentage of change in a TBS is larger for lower TBS values.

b) A number of $R_{SIB1bis}$ repetitions used or required for a LC-SIB1 transmission every $T_{SIB1bis}$ system frames depends on several factors including a respective TBS, a channel medium, a target BLER, and so on, and can vary from a number as low as 4 for a smallest TBS and large SINRs for all LC/CE UEs in a cell to as large as 16 or more for a largest TBS and low SINRs for some LC/CE UEs in the cell. Then, starting from 4 repetitions, 2 bits in a LC-MIB can indicate one of {4, 8, 16, 32} repetitions for a LC-SIB1 transmission per $T_{SIB1bis}$ period of 8 system frames.

c) A number of repetitions within a period of $T_{SIB1bis}=8$ system frames can depend on a number of SFs that can be used for the repetitions. For example, for a TDD system, when only SF5 in odd system frames is used, there can only be a maximum of 4 repetitions per 8 system frames while when both SF0 and SF5 are used in every system frame, there can be a maximum of 16 repetitions per 8 system frames. To avoid having an exceedingly long detection time for a LC-SIB1, such as −10 seconds in case of 1 repetition every 2 system frames, eNB 102 can configure through signaling in a LC-MIB a value for $R_{SIB1bis}$ and potentially enable use of all available SFs per system frame ($R_{SIB1bis}=32$) for repetitions of a LC-SIB1 transmission, such as in case of large TBS and/or large CE level in a respective cell. When a LC-SIB1 TBS is small and/or a CE level in the cell is small, eNB 102 can configure through signaling in a LC-MIB use of only 1 SF every 2 system frames ($R_{SIB1bis}=4$) for repetitions of a LC-SIB1 transmission.

Considering the above, it is not preferable from a LC-MIB signaling overhead perspective, to separately indicate a TBS and a number of $R_{SIB1bis}$ repetitions per $T_{SIB1bis}$ period. A table with 32 or 64 entries corresponding to 5 or 6, respectively, LC-MIB bits can instead capture most relevant combinations of TBS and $R_{SIB1bis}$. For example, small TBS values can be primarily associated with small $R_{SIB1bis}$ values while large TBS values can be primarily associated with large $R_{SIB1bis}$ values. As previously mentioned, LC/UE 114 can determine the SF number for each of the $R_{SIB1bis}$ SFs within $T_{SIB1bis}$ system frames from the SFN and the PCID associated with eNB 102. Moreover, 1-bit indication in LC-MIB of whether or not eNB 102 supports CE can be avoided based on the table entries (one state can indicate no support for CE). TABLE 5 provides a mapping for 5 spare bits in a LC-MIB to TBS values and $R_{SIB1bis}$ values.

TABLE 5

LC-MIB signaling Information Mapping to TBS and Number of Repetitions

| Value of 5 Bits | TBS | Repetitions $R_{SIB1bis}$ per $T_{SIB1bis}$ = 8 system frames |
|---|---|---|
| 00000 | 40 | 4 |
| 00001 | 40 | 8 |

TABLE 4

TBS Table for DCI Format 1C (see also Table 7.1.7.2.3-1 in REF 3)

| | | | | | | | $I_{TBS}$ | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| TBS | 40 | 56 | 72 | 120 | 136 | 144 | 176 | 208 | 224 | 256 | 280 | 296 | 328 | 336 | 392 | 488 |
| TBS | 552 | 600 | 632 | 696 | 776 | 840 | 904 | 1000 | 1064 | 1128 | 1224 | 1288 | 1384 | 1480 | 1608 | 1736 |

TABLE 5-continued

LC-MIB signaling Information Mapping to TBS and Number of Repetitions

| Value of 5 Bits | TBS | Repetitions $R_{SIB1bis}$ per $T_{SIB1bis}$ = 8 system frames |
|---|---|---|
| 00010 | 40 | 16 |
| 00011 | 40 | 32 |
| 00100 | 72 | 4 |
| 00101 | 72 | 8 |
| 00110 | 72 | 16 |
| 00111 | 72 | 32 |
| 01000 | 136 | 4 |
| 01001 | 136 | 8 |
| 01010 | 136 | 16 |
| 01011 | 136 | 32 |
| 01100 | 176 | 4 |
| 01101 | 176 | 8 |
| 01110 | 176 | 16 |
| 01111 | 176 | 32 |
| 10000 | 256 | 4 |

TABLE 5-continued

LC-MIB signaling Information Mapping to
TBS and Number of Repetitions

| Value of 5 Bits | TBS | Repetitions $R_{SIB1bis}$ per $T_{SIB1bis}$ = 8 system frames |
|---|---|---|
| 10001 | 256 | 8 |
| 10010 | 256 | 16 |
| 10011 | 256 | 32 |
| 10100 | 328 | 4 |
| 10101 | 328 | 8 |
| 10110 | 328 | 16 |
| 10111 | 328 | 32 |
| 11000 | 552 | 4 |
| 11001 | 552 | 8 |
| 11010 | 552 | 16 |
| 11011 | 552 | 32 |
| 11100 | 1000 | 4 |
| 11101 | 1000 | 8 |
| 11110 | 1000 | 16 |
| 11111 | 1000 | 32 |

Various embodiments of the disclosure provide for coexistence among transmissions with repetitions from a LC/CE UE and SRS transmissions from non-LC UEs.

RA preamble, or PUSCH, or PUCCH transmissions with repetitions over a number of SFs from LC/CE UE 114 can potentially collide (coexist in same frequency resources in a same SF symbol), in one or more SFs from the number of SFs, with SRS transmissions from non-LC UEs.

For LC/CE UE 114 transmitting a RA preamble with repetitions over a number of SFs, it is beneficial to avoid collisions between repetitions and SRS transmissions from non-LC UEs. When such collisions are not avoided, a structure of a RA preamble is compromised because a SRS can be received with larger power at eNB 102 since a non-LC UE can have normal coverage.

In a first example, to enable such collision avoidance, a LC-SIB can inform of a SRS configuration (see also REF 1) in a respective cell. Based on this configuration, LC/CE UE 114 can determine a BW and SFs where non-LC UEs can potentially transmit SRS. For a repetition of a RA preamble that overlaps in BW with a SRS BW in a SF indicated as a SRS transmission SF in the SRS configuration, LC/CE UE 114 can skip transmitting a repetition of the RA preamble in the SF. Equivalently, eNB 102 can configure LC/CE UE 114 using a bit-map of 10 bit with valid SFs per system frame where LC/CE UE can transmit repetitions of an UL transmission. For example, SFs where non-LC UEs can transmit SRS can be configured to LC/CE UE 114 as invalid SFs for repetitions of an UL transmission.

Figure 16:
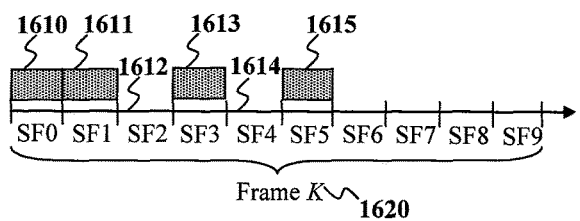
FIG. 16 illustrates a RA preamble transmission with repetitions from a LC/CE UE that accounts for potential presence of SRS transmissions from non-LC UEs according to this disclosure.

FIG. 16 illustrates a RA preamble transmission with repetitions from a LC/CE UE that accounts for potential presence of SRS transmissions from non-LC UEs according to this disclosure.

LC/CE UE 114 transmits a RA preamble with 4 repetitions. Based on information obtained from a LC-SIB, LC/CE UE 114 determines that LC/CE UE 114 can start transmission of the RA preamble in SF0 1610 of system frame K 1620 and that non-LC UEs can potentially transmit SRS in SF2 1612 and SF4 1614 making SF2 1612 and SF4 1614 invalid SFs for repetitions of the RA preamble transmission. Based on the determination, LC/CE UE 114 transmits the RA preamble with a first repetition in SF0 1610, a second repetition in SF1 1611, a third repetition in SF3 1613 and a fourth repetition in SF5 1615. The LC/CE UE skips transmitting a repetition for the RA preamble in SF2 1612 and SF4 1614.

In a second example, as a smallest guard time of a RA preamble transmission is 0.097 msec (see also REF 1) and is larger than a SRS symbol duration of $\frac{1}{14}$=0.071 msec, LC/CE UE 114 can transmit repetitions of a RA preamble even in SFs that non-LC UEs can potentially transmit SRS. This requires that a cell size is small enough for a difference between a guard time in a RA preamble format and a SF symbol duration to be sufficient for the guard time to enable interference avoidance among RA preambles transmitted in successive SFs from different LC/CE UEs having different distances to eNB 102. To enable a RA preamble transmission from LC/CE UE 114 in a SF where non-LC UEs can potentially transmit SRS, eNB 102 can configure LC/CE UE 114 a RA preamble format with larger guard time than needed for a cell size served by eNB 102. A different RA preamble format with shorter guard time can be configured to non-LC UEs or to LC/CE UEs transmitting a RA preamble without repetitions than to LC/CE UEs transmitting RA preambles with repetitions. This approach can enable repetitions of a RA preamble transmission without skipping SFs where non-LC UEs can potentially transmit SRS. A tradeoff is a degraded RA preamble detection at eNB 102 as a larger guard time than necessary for a cell size is used and this reduces RA preamble duration in a SF.

When LC/CE UE 114 cannot detect a RAR after a first number of RA preamble transmissions (first number of attempts), with each transmission having a first number of repetitions, LC/CE UE 114 continues with up to a second number of RA preamble transmission attempts (second number of attempts) with each transmission having a second number of repetitions. The second number of repetitions is larger than the first number of repetitions and both are indicated in a LC-SIB. LC/CE UE 114 continues with RA preamble transmissions until LC/CE UE 114 detects a RAR or until a number of attempts for a largest number of RA preamble repetitions that is supported by eNB 102 in the cell, as indicated by a LC-SIB, is reached. The eNB 102 can configure a number of attempts for RA preamble transmissions for each respective number of repetitions (CE level) in a LC-SIB. In a first approach, a configuration of each number of attempts for each CE level can be independent for each CE level. In a second approach, a set of numbers of attempts can be jointly configured for CE levels in order to reduce signaling overhead in the LC-SIB. For example, for the second approach, with 2 bits in a LC-SIB and four possible numbers for RA preamble repetitions, such as {4, 8, 16, 32}, corresponding to four CE levels, a value of '00' can correspond to {4, 4, 2, 2} attempts, a value of '10' can correspond to {6, 4, 2, 2} attempts, a value of '10' can correspond to {6, 4, 4, 2} attempts, and a value of '11' can correspond to {6, 6, 4, 2} attempts for the respective four CE levels.

For repetitions of a RA preamble transmission, when frequency hopping is enabled and a LC-SIB indicates a same two sub-bands and a same frequency hopping granularity (number of SFs), $Y_{CH}$, for two RA preamble transmissions with different RA preamble repetition numbers, a first $Y_{CH}$ repetitions for a smaller/larger repetition number are in a sub-band with smaller/larger index, respectively (and second $Y_{CH}$ repetitions for a smaller/larger repetition number are in a sub-band with larger/smaller index, respectively). When the LC-SIB indicates sub-bands for a number of repetitions of RA preamble transmission that are different than sub-bands for another number of repetitions of RA preamble transmission and there are a total of $N_{RA}$ RA preambles for a RA preamble repetition number, a first $Y_{CH}$ repetitions of a RA preamble transmission with index smaller/larger than ⌈N_{RA}/2⌉ can start from a sub-band with a smaller/larger index, respectively.

For a PUSCH transmission from a non-LC UE that collides at least partially in BW with potential SRS transmissions from other non-LC UEs, the non-LC UE does not transmit the PUSCH in a last SF symbol and applies rate matching for associated data symbols over remaining available SF symbols (SF symbols other than ones used to transmit DMRS)—see also REF 2. When LC/CE UE 114 transmits a PUSCH with repetitions, using rate matching does not allow I/Q combining of data symbols prior to demodulation and this can lead to a worse reliability for data symbol demodulation. To improve reception reliability at eNB 102, LC/CE UE 114 applies a same rate matching in each SF for repetitions of a PUSCH transmission in a number of SFs. The rate matching can be according to absence of SRS transmissions (assumes availability of a last SF symbol for data transmission) regardless of potential SRS transmissions from non-LC UEs in a BW that at least partially overlaps with a PUSCH transmission BW in the SF. Additionally, in SFs where non-LC UEs can potentially transmit SRS, LC/CE UE 114 does not transmit PUSCH in symbols where SRS can be transmitted, such as a last SF symbol, in order to avoid creating interference to SRS transmissions and to reduce power consumption.

For a TDD system, as LC/CE UE 114 can receive a LC-SIB1 only in SFs that are guaranteed to support DL transmissions regardless of an UL/DL configuration or regardless of a special SF configuration (assuming that LC/CE UE 114 does not attempt to detect LC-SIB1 according to multiple predetermined hypotheses), a latency associated with detecting LC-SIB1 can be large as a number of SFs per system frame where LC-SIB1 is transmitted can be small. To reduce or minimize this latency for other LC-SIB transmissions, LC-SIB1 can explicitly or implicitly inform of an UL/DL configuration, a special SF configuration and, for either a FDD system or a TDD system, of ABS and MBSFN SF configurations that can potentially enable LC/CE UE 114 to receive repetitions of a subsequent PDSCH transmission, such as ones conveying a second LC-SIB (LC-SIB2), or of a subsequent MPDCCH transmission over a larger number of SFs per system frame.

In general, for a transmission of a DL channel using repetitions, where some SFs per system frame can be UL SFs, as in a TDD system, or MBMS SFs, a number of repetitions can be defined by including SFs where an actual repetition is not possible (invalid SFs). This can simplify the definition for a number of repetitions of a DL channel transmission without having to exclude each combination of SFs per system frame that cannot be used for an actual repetition (and include only SFs that can be used for an actual repetition). LC/CE UE 114 is aware of such SFs, through information in a LC-SIB, and can skip reception of a presumed repetition. For example, for ten configured repetitions of a DL channel transmission and for a system frame that include six MBSFN SFs, actual repetitions occur in four SFs per system frame that are indicated in LC-SIB1 as being valid DL SFs. For a TDD system and PUSCH scheduling by a MPDCCH, a last actual repetition for the MPDCCH transmission can be in a DL SF that supports a MPDCCH transmission without repetitions for scheduling a PUSCH (see also REF 3).

After LC/CE UE 114 detects the LC-SIBs transmitted by eNB 102, LC/CE UE 114 attempts to establish an RRC connection with eNB 102 through a RA process having same steps as for a non-LC UE (see also REF3 and REF 5). The RA process starts by LC/CE UE 114 transmitting a RA preamble. When LC/CE UE 114 determines that LC/CE UE 114 needs to transmit a RA preamble with repetitions, where the determination can be based, for example, on a RS received power (RSRP) measurement or on a failure to receive a RAR for RA preamble transmissions without repetitions, LC/CE UE 114 transmits repetitions of a RA preamble only in SFs that are indicated as valid UL SFs by a LC-SIB1. For example, a LC-SIB can provide a bit-map of 10 bits indicating valid UL SFs per system frame for repetitions of UL transmissions from LC/CE UEs.

When eNB 102 adapts (at a faster rate than a LC-SIB1 update period) an UL/DL configuration, it is possible that LC/CE UEs cannot detect a signaling that informs of an adapted UL/DL configuration. Then, based on an indication in a LC-SIB, LC/CE UE 114 receives repetitions of a PDSCH or MPDCCH transmission only in SFs that are indicated as DL SFs in an UL-reference UL/DL configuration, as defined in REF 3, and transmits repetitions of a PUSCH or PUCCH transmission only in SFs that are indicated as UL SFs in a DL-reference UL/DL configuration. Similar, as previously mentioned, LC/CE UE 114 receives repetitions of a PDSCH or MPDCCH transmission only in SFs that are indicated as valid DL SFs by LC-SIB1 and transmits repetitions of a PUSCH or PUCCH transmission only in SFs that are indicated as valid UL SFs by LC-SIB1.

Figure 17:
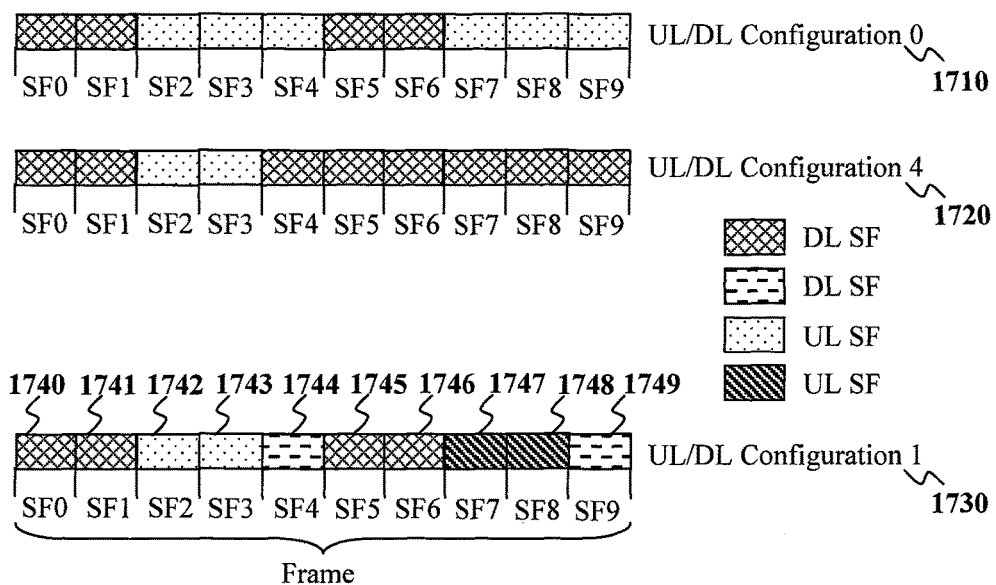
FIG. 17 illustrates receptions by a LC/CE UE of repetitions for a PDSCH or an MPDCCH transmission and transmissions from the LC/CE UE of repetitions for a PUSCH or a PUCCH transmission according to this disclosure.

FIG. 17 illustrates receptions by a LC/CE UE of repetitions for a PDSCH or an MPDCCH transmission and transmissions from the LC/CE UE of repetitions for a PUSCH or a PUCCH transmission according to this disclosure.

A DL-reference UL/DL configuration is UL/DL configuration 0 1710 and an UL-reference UL/DL configuration is UL/DL configuration 4 1720. The eNB 102 adapts an UL/DL configuration to UL/DL configuration 1 1730. Based on a bit-map that LC/CE UE 114 receives in LC-SIB1 and indicates valid DL SFs and valid UL SFs for repetitions of DL transmissions or of UL transmissions, respectively, LC/CE UE 114 receives a DL channel, such as a PDSCH or an MPDCCH, only in SF0 1740, SF1 1741, SF5 1745, and SF6 1746 and does not receive in SF4 1744 and SF9 1749 that are DL SFs in an actual UL/DL configuration (UL/DL configuration 1) used by eNB 102 as SF4 1744 and SF9 1749 are indicated as invalid DL SFs. LC/CE UE 114 transmitting an UL channel, such as a PUSCH or a PUCCH, transmits only in SF2 1742 and SF3 1743 and does not transmit in SF7 1747 and SF8 1748 that are UL SFs in the actual UL/DL configuration (UL/DL configuration 1) used by eNB 102 as SF7 1747 and SF8 1748 are indicated as invalid UL SFs.

Therefore, based on signaling LC/CE UE 114 receives in LC-SIB1, LC/CE UE 114 receives repetitions of a PDSCH or MPDCCH transmission or transmits repetitions of a PUSCH or PUCCH transmission only in SFs that eNB 102 indicates in LC-SIB1 as valid DL SFs or valid UL SFs, respectively, and it is possible that LC UE 114 does not receive repetitions of a PDSCH or MPDCCH transmission or transmit repetitions of a PUSCH or PUCCH transmission in DL SFs or UL SFs, respectively.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor,"

or "controller," within a claim is understood by the applicants to refer to structures known to those skilled in the relevant art and is not intended to invoke 35 U.S.C. § 112(f).

Although the present disclosure has been described with example embodiments, various changes and modifications can be suggested to one skilled in the art. It is intended that the present disclosure encompass such changes and modifications that fall within the scope of the appended claims.

What is claimed is:

1. A method, comprising:
receiving a number of repetitions for a physical downlink shared channel (PDSCH) that provides a first system information block (SIB1) in a set of sub-bands (SBs) of a cell; and
determining the set of SBs to include the SBs with indexes $$(N_{ID}^{cell} \bmod N_{SB}^{DL} + i \cdot \lfloor N_{SB}^{DL}/m \rfloor) \bmod N_{SB}^{DL},$$

where i=0, ..., m−1, m is an integer number, $N_{SB}^{DL}$ is a number of SBs in a downlink (DL) system bandwidth (BW) that are available for the reception of the number of repetitions, and $N_{ID}^{cell}$ is a physical cell identifier (PCID).

2. The method of claim 1, wherein an SB includes 6 resource blocks (RBs), an RB includes 12 sub-carriers, and the set of SBs includes all SBs in the DL system BW except for SBs overlapping with the middle 6 RBs of the DL system BW.

3. The method of claim 2, wherein m=2 when $N_{ID}^{cell}$ is smaller than or equal to a predetermined number and the set of SBs includes two or more SBs.

4. The method of claim 1, wherein m=4 when $N_{ID}^{cell}$ is larger than a predetermined number.

5. The method of claim 1, wherein the repetitions of the PDSCH reception cycle through the SBs in the set of SBs serially according to the value of starting from i=0.

6. The method of claim 1, wherein one repetition of the PDSCH reception is in one subframe of a frame that includes 10 subframes, and wherein the number of repetitions of the PDSCH reception over 8 frames is indicated by a field in a master information block (MIB).

7. A user equipment (UE), comprising:
a receiver configured to receive a number of repetitions for a physical downlink shared channel (PDSCH) that provides a first system information block (SIB1) in a set of sub-bands (SBs) of a cell; and
a processor configured to determine the set of SBs to include the SBs with indexes $$(N_{ID}^{cell} \bmod N_{SB}^{DL} + i \cdot \lfloor N_{SB}^{DL}/m \rfloor) \bmod N_{SB}^{DL},$$

where i=0, ..., m−1, m is an integer, $N_{SB}^{DL}$ is a number of SBs in a downlink (DL) system bandwidth (BW) that are available for the reception of the number of repetitions, and $N_{ID}^{cell}$ is a physical cell identifier (PCID).

8. The UE of claim 7, wherein an SB includes 6 resource blocks (RBs), an RB includes 12 sub-carriers, and the set of SBs includes all SBs in the DL system BW except for SBs overlapping with the middle 6 RBs of the DL system BW.

9. The UE of claim 8, wherein m=2 when $N_{SB}^{DL}$ is smaller than or equal to a predetermined number and the set of SBs includes two or more SBs.

10. The UE of claim 7, wherein m=4 when $N_{SB}^{DL}$ is larger than a predetermined number.

11. The UE of claim 7, wherein the repetitions of the PDSCH reception cycle through the SBs in the set of SBs serially according to the value of i starting from i=0.

12. The UE of claim 7, wherein one repetition of the PDSCH reception is in one subframe of a frame that includes 10 subframes, and wherein the number of repetitions of the PDSCH reception over 8 frames is indicated by a field in a master information block (MIB).

13. The UE of claim 12, wherein the subframes of a frame that include a repetition of the PDSCH reception are predetermined based on the number of repetitions.

14. A base station, comprising:
a transmitter configured to transmit a number of repetitions for a physical downlink shared channel (PDSCH) that provides a first system information block (SIB1) in a set of sub-bands (SBs) of a cell; and
a processor configured to determine the set of SBs to include the SBs with indexes $$(N_{ID}^{cell} \bmod N_{SB}^{DL} + i \cdot \lfloor N_{SB}^{DL}/m \rfloor) \bmod N_{SB}^{DL},$$

where i=0, ..., m−1, m is an integer, $N_{SB}^{DL}$ is a number of SBs in a downlink (DL) system bandwidth (BW) that are available for the reception of the number of repetitions, and $N_{ID}^{cell}$ is a physical cell identifier (PCID).

15. The base station of claim 14, wherein an SB includes 6 resource blocks (RBs), an RB includes 12 sub-carriers, and the set of SBs includes all SBs in the DL system BW except for SBs overlapping with the middle 6 RBs of the DL system BW.

16. The base station of claim 15, wherein m=2 when $N_{SB}^{DL}$ is smaller than or equal to a predetermined number and the set of SBs includes 2 or more SBs.

17. The base station of claim 14, wherein m=4 when $N_{SB}^{DL}$ is larger than a predetermined number.

18. The base station of claim 14, wherein the repetitions of the PDSCH transmission cycle through the SBs in the set of SBs serially according to the value of i starting from i=0.

19. The base station of claim 14, wherein one repetition of the PDSCH transmission is in one subframe of a frame that includes 10 subframes, and wherein the number of repetitions of the PDSCH transmission over 8 frames is indicated by a field in a master information block (MIB).

20. The base station of claim 19, wherein the subframes of a frame that include a repetition of the PDSCH transmission are predetermined based on the number of repetitions.

* * * * *